United States Patent
Axelsson et al.

(10) Patent No.: US 10,175,845 B2
(45) Date of Patent: *Jan. 8, 2019

(54) ORGANIZING DIGITAL NOTES ON A USER INTERFACE

(71) Applicant: 3M INNOVATIVE PROPERTIES COMPANY, St. Paul, MN (US)

(72) Inventors: Pontus Axelsson, Stockholm (SE); Kyle W. English, St. Paul, MN (US); David M. Mahli, Woodbury, MN (US); Richard J. Moore, Maplewood, MN (US); Cristin E. Moran, St. Paul, MN (US); Roland Persson, Stockholm (SE); Michael Rotstein, Stockholm (SE); Guruprasad Somasundaram, Minneapolis, MN (US); Diane R. Wolk, Woodbury, MN (US); Linus Åkerlund, Johanneshov (SE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,669

(22) Filed: Oct. 15, 2014

(65) Prior Publication Data

US 2015/0106760 A1  Apr. 16, 2015

Related U.S. Application Data

(60) Provisional application No. 61/891,647, filed on Oct. 16, 2013, provisional application No. 61/891,442, (Continued)

(51) Int. Cl.
G06F 3/0486 (2013.01)
G06F 17/30 (2006.01)
(Continued)

(52) U.S. Cl.
CPC .......... *G06F 3/0481* (2013.01); *G06F 3/0482* (2013.01); *G06F 3/0483* (2013.01); (Continued)

(58) Field of Classification Search
CPC ........................ G06F 3/0486; G06F 17/30705
See application file for complete search history.

(56) References Cited

U.S. PATENT DOCUMENTS 5,319,745 A   6/1994  Vinsonneau
5,465,165 A   11/1995 Tanio
(Continued)

FOREIGN PATENT DOCUMENTS

EP   1182861     2/2002
JP   2009-20813  1/2009
(Continued)

OTHER PUBLICATIONS

Merriam Webster.com entry for "overlap", retrieved on Feb. 6, 2017 from Internet Archive Wayback Machine crawl of Apr. 6, 2013 from http://web.archive.org/web/20130406154746/http://www.merriam-webster.com/dictionary/overlap.*
(Continued)

*Primary Examiner* — Abdullah Al Kawsar
*Assistant Examiner* — Patrick Ramsey

(57) ABSTRACT

At least some aspects of the present disclosure feature a computing device configured to display visual representations of digital notes and one or more group images representing one or more groups on a user interface, where each group may include one or more digital notes. The computing device is further configured to receive one or more user inputs via the user interface and change the compositions of the groups based on the received user inputs.

16 Claims, 26 Drawing Sheets

Related U.S. Application Data filed on Oct. 16, 2013, provisional application No. 61/934,392, filed on Jan. 31, 2014.

(51) Int. Cl.
| | |
|---|---|
| *G06F 3/0481* | (2013.01) |
| *G06F 3/0482* | (2013.01) |
| *G06F 3/0483* | (2013.01) |
| *G06F 17/21* | (2006.01) |
| *G06K 9/00* | (2006.01) |
| *G06F 9/451* | (2018.01) |
| *G06F 1/16* | (2006.01) |
| *G06F 3/0488* | (2013.01) |

(52) U.S. Cl.
CPC ........ *G06F 3/0486* (2013.01); *G06F 3/04817* (2013.01); *G06F 9/451* (2018.02); *G06F 17/21* (2013.01); *G06F 17/211* (2013.01); *G06F 17/30011* (2013.01); *G06K 9/00442* (2013.01); *G06F 1/1639* (2013.01); *G06F 3/04886* (2013.01); *G06F 2203/04806* (2013.01)

(56) References Cited

U.S. PATENT DOCUMENTS

| | | | |
|---|---|---|---|
| 5,546,474 | A | 8/1996 | Zuniga |
| 5,590,219 | A | 12/1996 | Gourdol |
| 5,608,853 | A | 4/1997 | Dujari |
| 5,898,434 | A | 4/1999 | Small |
| 6,104,832 | A | 8/2000 | Saito |
| 6,351,559 | B1 | 2/2002 | Zhou |
| 6,486,894 | B1 | 11/2002 | Abdelhadi |
| 6,721,733 | B2 | 4/2004 | Lipson |
| 6,947,571 | B1 | 9/2005 | Rhoads |
| 7,072,512 | B2 | 7/2006 | Mehrotra |
| 7,343,415 | B2 | 3/2008 | Kenner |
| 7,561,310 | B2 | 7/2009 | Joyce |
| 7,573,598 | B2 | 8/2009 | Cragun |
| 7,774,479 | B2 | 8/2010 | Kenner |
| 7,837,094 | B2 | 11/2010 | Rhoads |
| 8,069,173 | B2 | 11/2011 | Munekuni |
| 8,113,432 | B2 | 2/2012 | Kimura |
| 8,139,852 | B2 | 3/2012 | Shinjo |
| 8,229,481 | B2 | 7/2012 | Meng et al. |
| 8,238,666 | B2 | 8/2012 | Besley |
| 8,256,665 | B2 | 9/2012 | Rhoads |
| 8,264,499 | B1 | 9/2012 | Landry |
| 8,380,040 | B2 | 2/2013 | Carter |
| 8,416,466 | B2 | 4/2013 | Takata |
| 8,429,174 | B2 | 4/2013 | Ramani |
| 8,457,449 | B2 | 6/2013 | Rhoads |
| 8,503,791 | B2 | 8/2013 | Conwell |
| 8,542,889 | B2 | 9/2013 | Sarnoff |
| 8,543,926 | B2 | 9/2013 | Giles |
| 8,558,913 | B2 | 10/2013 | Pillman |
| 8,600,167 | B2 | 12/2013 | Showering |
| 8,655,068 | B1 | 2/2014 | Li |
| 8,806,354 | B1 * | 8/2014 | Hyndman ............ G06F 3/04883 709/204 |
| 9,628,423 | B2 | 4/2017 | Tetsuhashi |
| 2003/0076539 | A1 | 4/2003 | Nakajima |
| 2003/0125055 | A1 | 7/2003 | Kim |
| 2004/0017400 | A1 | 1/2004 | Ly |
| 2004/0017941 | A1 | 1/2004 | Simske |
| 2004/0021790 | A1 * | 2/2004 | Iga .......................... H04N 1/04 348/333.12 |
| 2005/0091578 | A1 | 4/2005 | Madan |
| 2006/0039045 | A1 | 2/2006 | Sato |
| 2006/0077468 | A1 | 4/2006 | Loce |
| 2006/0221357 | A1 | 10/2006 | Uzawa |
| 2007/0089049 | A1 | 4/2007 | Gormish |
| 2007/0110277 | A1 | 5/2007 | Hayduchok |
| 2007/0176780 | A1 | 8/2007 | Hart |
| 2008/0021701 | A1 | 1/2008 | Bobick |
| 2008/0043043 | A1 | 2/2008 | Thielen |
| 2008/0075364 | A1 | 3/2008 | Speigle |
| 2008/0143739 | A1 | 6/2008 | Harris |
| 2009/0307607 | A1 | 12/2009 | Schauls |
| 2010/0023878 | A1 | 1/2010 | Douris |
| 2010/0058215 | A1 * | 3/2010 | Chung ................ G06F 3/04817 715/769 |
| 2010/0096452 | A1 | 4/2010 | Habraken |
| 2010/0191772 | A1 | 7/2010 | Brown |
| 2010/0202680 | A1 | 8/2010 | Hamasaki |
| 2010/0329555 | A1 | 12/2010 | Chapman |
| 2011/0069017 | A1 * | 3/2011 | Victor .......................... 345/173 |
| 2011/0081948 | A1 | 4/2011 | Shirai |
| 2011/0066658 | A1 | 5/2011 | Rhoads |
| 2011/0164815 | A1 | 7/2011 | Sharma |
| 2011/0187731 | A1 | 8/2011 | Tsuchida |
| 2011/0285123 | A1 | 11/2011 | Wittke |
| 2011/0293179 | A1 | 12/2011 | Dikmen |
| 2012/0014456 | A1 | 1/2012 | Martinez Bauza |
| 2012/0151577 | A1 | 6/2012 | King |
| 2012/0314031 | A1 | 12/2012 | Shotton |
| 2012/0320410 | A1 | 12/2012 | Kakegawa |
| 2012/0324372 | A1 * | 12/2012 | Kowalkiewicz ..... G06Q 10/101 715/753 |
| 2013/0022330 | A1 | 1/2013 | Carter |
| 2013/0054636 | A1 | 2/2013 | Tang |
| 2013/0125046 | A1 | 5/2013 | Gaul |
| 2013/0129206 | A1 | 5/2013 | Worthington |
| 2013/0163047 | A1 | 6/2013 | Miyamoto |
| 2013/0217440 | A1 | 8/2013 | Lord |
| 2013/0227476 | A1 | 8/2013 | Frey |
| 2013/0258117 | A1 | 10/2013 | Penov |
| 2013/0258122 | A1 | 10/2013 | Keane |
| 2013/0271784 | A1 | 10/2013 | Nakajima |
| 2014/0024411 | A1 | 1/2014 | Rao |
| 2014/0050409 | A1 | 2/2014 | Constantinou |
| 2014/0053086 | A1 | 2/2014 | Kim |
| 2014/0056512 | A1 | 2/2014 | Lerios |
| 2014/0164852 | A1 | 6/2014 | Sumiyoshi |
| 2014/0218372 | A1 * | 8/2014 | Missig .................... G06F 3/044 345/473 |
| 2014/0245123 | A1 * | 8/2014 | Pircher ................ G06F 17/241 715/232 |
| 2014/0282077 | A1 | 9/2014 | Wilson |
| 2014/0294236 | A1 | 10/2014 | Biller |
| 2014/0297646 | A1 | 10/2014 | Bastiaens |
| 2014/0358613 | A1 | 12/2014 | Libin |
| 2015/0098649 | A1 * | 4/2015 | Miyashita ............ G06K 9/2063 382/165 |

FOREIGN PATENT DOCUMENTS

| | | |
|---|---|---|
| JP | 2011-090486 | 5/2011 |
| JP | 2015075925 A * | 4/2015 |
| TW | M457245 | 7/2013 |
| WO | WO 2012-070935 | 5/2012 |
| WO | WO 2013-085512 | 6/2013 |
| WO | WO 2013-184767 | 12/2013 |
| WO | WO 2014-165438 | 10/2014 |

OTHER PUBLICATIONS

Boykov, "Graph Cuts and Efficient N-D Image Segmentation", International Journal of Computer Vision, 2006, vol. 70, No. 2, pp. 109-131.

Davidson, "Calculation of Color Differences From Visual Sensitivity Ellipsoids", Journal of the Optical Society of America, Dec. 1951, vol. 41, No. 12, pp. 1052-1055.

Everitt, "Two Worlds Apart: Bridging the Gap Between Physical and Virtual Media for Distributed Design Collaboration", CHI 2003, Apr. 5-10, 2003, 8 pages.

Felzenszwalb, "Efficient Graph-Based Image Segmentation", International Journal of Computer Vision, 2004, vol. 59, No. 2, pp. 167-181.

Fisher, "Change Detection in Color Images", Proceedings of 7th IEEE Conference on Computer Vision and Pattern, 1999; 6 pages.

(56) References Cited

OTHER PUBLICATIONS

Frome, "Visibility of Borders: Separate and Combined Effects of Color Differences, Luminance Contrast, and Luminance Level", J. Opt. Soc. Am., Feb. 1981, vol. 71, No. 2, pp. 145-150.
Geyer, "Experiences From Employing Evernote as a Tool for Documenting Collaborative Design Processes", Conference on Designing Interactive System DIS 2012, Workshop on Supporting Reflection in and on Design Processes, Jun. 12, 2012, 2 pages.
Gur, "Isoluminant Stimuli May Not Expose the Full Contribution of Color to Visual Functioning: Spatial Contrast Sensitivity Measurements Indicate Interaction Between Color and Luminance Processing", Vision Research, Jul. 7, 1992, vol. 32, No. 7, pp. 1253-1262.
Hsieh, "Peripheral Display of Digital handwritten notes", CHI Proceedings of the SIGCHI Conference on Human Factors in Computing Systems, Apr. 22-27, 2006, pp. 285-288.
"King jim Shot Note", [Online], [retrieved from internet on Sep. 17, 2014], URL :<http://www.kingjim.co.jp/english/products/shotnote/>, 2 pages.
Klemmer, "The Designers Outpost: A Tangible Interface for Collaborative Web Site Design", In Proceedings of UIST, 2001, 10 pages.
K-SVD, "An Algorithm for Designing Overcompiete Dictionaries for Sparse Representation", IEEE Transactions on Signal Processing, Nov. 2006, vol. 54, No. 11, pp. 4311-4322.
Masaoka, "Fast and Accurate Model for Optimal Color Computation", Optics Letters, Jun. 15, 2010, vol. 35, No. 12, pp. 2031-2033.
Mika, "Fisher Discriminant Analysis With Kernels", Neural Networks for Signal Processing IX, 1999. Proceedings of the 1999 IEEE Signal Processing Society Workshop in Neural Networks for Signal Processing IX, 1999. Proceedings of the 1999 IEEE Signal Processing Society Workshop, Aug. 1999, pp. 41-48.
Rajala, "Visual Sensitivity to Color-Varying Stimuli", Human Vision, Visual Processing and Digital Display III, Proc. SPIE. Aug. 27, 1992, vol. 1666, pp. 375-386.
Sharma, "The CIEDE2000 Color Difference Formula: Implementation Notes, Supplementary Test Data, and Mathematical Observations", Color Research & Application, Feb. 2005, vol. 30, No. 1, pp. 21-30.
Yang, "Photonic Crystal Changes Color When Exposed to an Explosion", Nanotechnology, SPIE Inetrnational Year of Light 2015, Apr. 25, 2011, [online], [retrieved from internet on Sep. 18, 2014], URL:<http://spie.org/x47872.xml?pf=true&ArticleID=x47872>, 3 pages.
Everitt, "Two Worlds Apart: Bridging the Gap Between Physical and Virtual Media for Distributed Design Collaboration", CHI 2003, Apr. 5-10, 2003, vol. No. 5, Issue No. 1, pp. 553-560.

ScanSpeeder Video Demo Screenshots, YouTube videos posted Jul. 30, 2014 retrieved from [https://www.youtube.com/playlist?list=UUY_BfwsP3RwTIxFSSj3oqqg] on [Dec. 11, 2014], 23 pages.
Serrano, CamScanner App Review—Scan with your Smartphone, LawyerTech Review.com, Blog post on Apr. 11, 2012, retrieved from [http://lawyertechreview.com/2012/camscanner-app-review] on [Dec. 11, 2014], 6 pages.
Geyer, et al, "Designing Reality-Based Interfaces for Creative Group Work", Proceedings of the 8th ACM Conference on Creativity and Cognition, C&C '11, Jan. 1, 2011, pp. 165-174.
Klemmer, et al, "The Designer's Outpost: A Tangible Interface for Collaborative Web Site Design", Proceedings of the 14$^{th}$ Annual ACM Symposium on user interface software and technology in Orlando, FL from Nov. 11-14, 2001; Jan. 1, 2001, 10 pp.
"Designing Reality-Based Interfaces for Creative Group Work", Geyer, University of Konstanz, Germany [online, You Tube], [available on the internet Jul. 7, 2011], [retrieved from the internet on Aug. 28, 2017], https://www.youtube.com/watch?v=6ArRBGEGPzA, pp. 3.
Geyer, "AffinityTable—A Hybrid Surface for Supporting Affinity Diagramming", Springer International Publishing, Sep. 5, 2011, pp. 477-484.
Wobbrock, "User-Defined Gestures for Surface Computing", The 27$^{th}$ Annual CHI Conference on Human Factors in Computing Systems dated Apr. 4-7, 2009, Boston, MA, pp. 1083-1092.
Supplementary European Search Report for EP Patent Application No. 14853510, dated Aug. 29, 2017.
Norbert A. Streitz et al., "i-Land", ACM CHI 1999; CHI Conference Proceedings; Human Factors in Computing Systems, May 1, 1999, pp. 120-127.
Joshua Hailpern et al., "Team Storm", Creativity and Cognition, ACM, Jun. 13, 2007, pp. 193-202.
Gunnar Harboe, "Understanding and augmenting a paper arrangement-based method", Proceedings of the 2013 ACM conference on Pervasive and Ubiquitous Computing adjunct publication, UbuComp '13, Switzerland, Sep. 12, 2013, pp. 343-348.
Florian Perteneder et al., "Idea Playground: When Brainstorming is Not Enough", Feb. 2, 2012, retrieved from the internet: http://hcitang.org/papers/2012-avi2012workshop-idea-playground.pdf [retrieved on Apr. 18, 2018.
Anonymous: "Scan Multiple Photos at Once then Separate and Straighten Automatically—ScanSpeeder Download", Oct. 12, 2013, retrieved from the internet: http://web.archive.org/web/20131012061222/http://scansppeder.com/ [retrieved on Sep. 29, 2017].

\* cited by examiner

| Device | Phases in the approach | Data exchanged |
|---|---|---|
| Camera on Phone /Hand-held device | Image Acquisition (102) | Input: Physical media/note in the presence of other objects<br>Output: Image or Video |
| Processor on the phone | Media / Note Detection (104) | Input: Image or Video frame<br>Output: Localization of note features using color, shape and patterns |
| Processor on the phone | Media / Note Extraction (106) | Input: Localization of note features<br>Output: Extracted notes into sub-images |
| Processor on the phone | Media / Note Enhancement (108) | Input: Extracted notes into sub-images<br>Output: Digitally enhanced sub-images that meets quailty standards after correction for shadow, lighting, rotation, scaling, etc. |
| Web server, Personal Computer, etc. | Storage, Sharing and Secondary Processing (110) | Input: Digitally enhanced sub-images<br>Output: Secondary applications, office suites, Dropbox, Evernote, etc. |

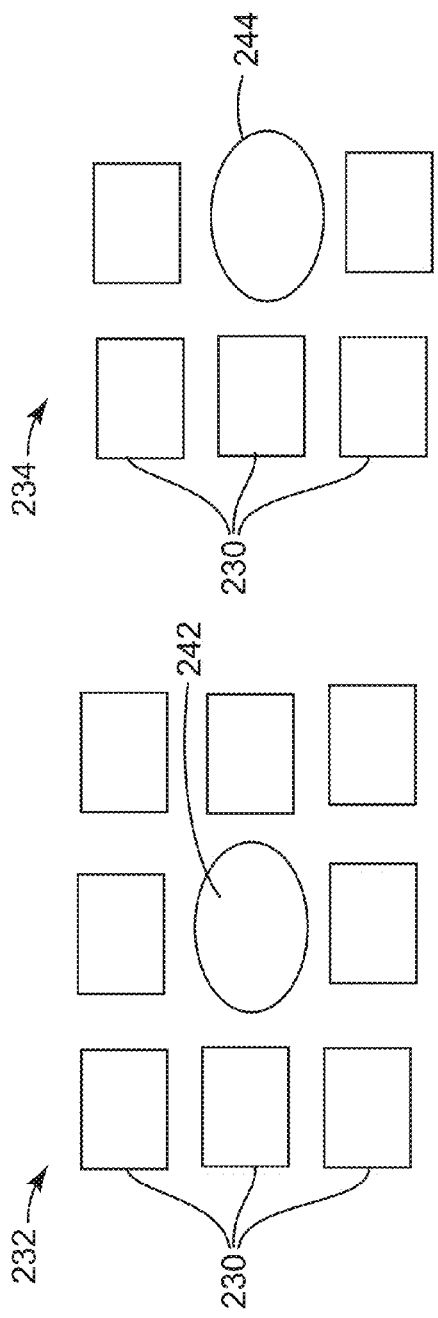
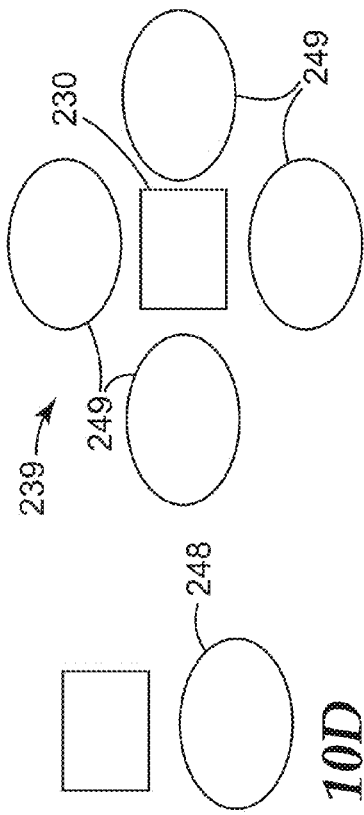
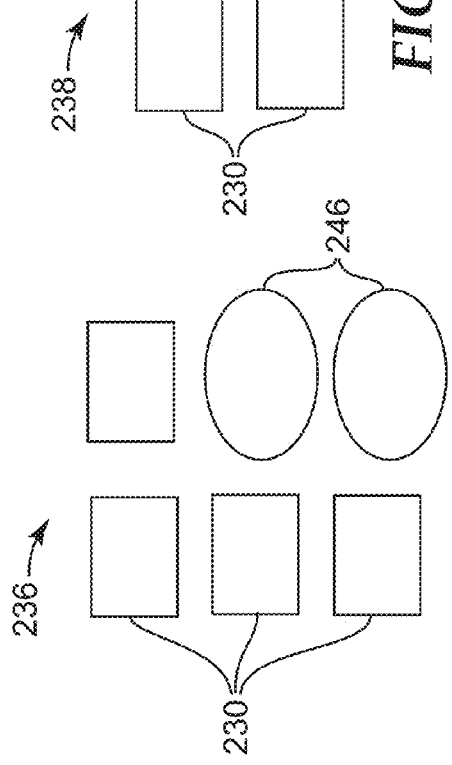

ORGANIZING DIGITAL NOTES ON A USER INTERFACE

This application claims the benefit of U.S. Provisional Application No. 61/891,647, filed Oct. 16, 2013; U.S. Provisional Application No. 61/891,442, filed Oct. 16, 2013; and U.S. Provisional Application No. 61/934,392, filed Jan. 31, 2014, the entire content of each of which is incorporated herein by reference.

TECHNICAL FIELD

The present disclosure relates to note content capturing, recognition, extraction, and/or management tools and systems.

BACKGROUND

Paper notes have been broadly used in recording, sharing, and communicating ideas and information. For example, during a collaboration session (e.g., brainstorming session), participants write down ideas on Post-It® notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

For example, in many situations people participate in a collaboration session by writing information on paper-based notes, such as Post-It® notes. Paper Post-It® notes can readily be removed from a dispenser pad of sticky-back paper Post-It® notes and applied to various surfaces, such as whiteboards, documents, the tops of desks, telephones, or the like. Information can be written on paper Post-It® notes either before or after the paper Post-It® notes are detached from their dispenser pad or attached to their target surfaces. Paper Post-It® notes can be easily moved from one surface to another, such as between documents or between documents and the tops of desks, they can overlap edges or boundaries of documents, they can be layered, and they can be moved with the objects to which they are attached.

Software programs currently exist which permit computer users to generate software-based notes in digital form and to utilize the digital notes within computing environments. For example, a computer user may create digital notes and "attach" the digital notes to an electronic document, a desktop, or an electronic workspace presented by the computing environment. The computer user may manipulate the notes, allowing the notes to be created, deleted, edited, saved, and selectively viewed. The computer user may move such a note within a document, or between documents and/or the desktop, by cutting the note from a document, storing the note in a clipboard, and then pasting the note to another area of the same document or to a different document. In this way, the software programs provide a virtual representation of notes and allow an individual to utilize the digital notes in a manner similar to physical notes that he or she may use on a daily basis.

SUMMARY

At least some aspects of the present disclosure feature a computing device comprising: a note management application configured to maintain a first group of digital notes and a second group of digital notes; an image rendering module configured to render a first group image representing the first group of digital notes and a second group image representing the second group of digital notes; and a user interface configured to display the first group image and the second group image. The user interface is further configured to receive a first user input indicating a first position within the first group image and a second user input indicating a second position within the second group image. The note management application is further configured to, responsive to receiving the first user input and the second user input: identify a digital note in the first group of digital notes based on the first position, modify the first group by removing the identified digital note from the first group, and modify the second group by adding the identified digital note to the second group.

At least some aspects of the present disclosure feature a computing device comprising: a note management application configured to maintain a first group of digital notes and a second group of digital notes; an image rendering module configured to render a first group image representing the first group of digital notes and a second group image representing the second group of digital notes; and a user interface configured to display the first group image and the second group image. The user interface is further configured to receive a first user input indicating a first position proximate to boundary of the first group image and a second user input indicating a second position within the second group image. The note management application is further configured to modify, responsive to receiving the first user input and the second user input, the second group of digital notes by adding the digital notes in the first group to the second group.

At least some aspects of the present disclosure feature a computing device comprising: a note management application configured to maintain a first digital note and a second digital note; an image rendering module configured to render a visual representation of the first digital note and a visual representation of the second digital note; and a user interface configured to display the visual representation of the first digital note and the visual representation of the second digital note. The user interface is further configured to receive a first user input indicating a first position proximate to the visual representation of the first digital note and a second user input indicating a second position proximate to the visual representation of the second digital note. The note management application is further configured to create a group including the first digital note and the second digital note responsive to receiving the first user input and the second user input.

At least some aspects of the present disclosure feature a method of managing digital notes with a computing device having a memory, a processor and a user interface. The method includes the step of: maintaining, by the computing device, a first group of digital notes and a second group of digital notes; rendering, by the computing device, a first group image representing the first group of digital notes and a second group image representing the second group of digital notes; displaying, by the computing device and at the user interface, the first group image and the second group image; receiving, by the computing device, a first user input indicating a first position within the first group image and a second user input indicating a second position within the second group image; identifying, by the computing device and based at least in part on the first user input and the second user input, a digital note in the first group of digital notes based on the first position; modifying the first group by removing the identified digital note from the first group; and modifying the second group by adding the identified digital note to the second group.

BRIEF DESCRIPTION OF DRAWINGS

The accompanying drawings are incorporated in and constitute a part of this specification and, together with the description, explain the advantages and principles of the invention. In the drawings.

FIG. 4A is a conceptual diagram illustrating an example note recognition process.

FIGS. 10A-10E are conceptual diagrams illustrating different examples of location voids that can be used as scoring based on heuristics.

DETAILED DESCRIPTION

Figure 1:
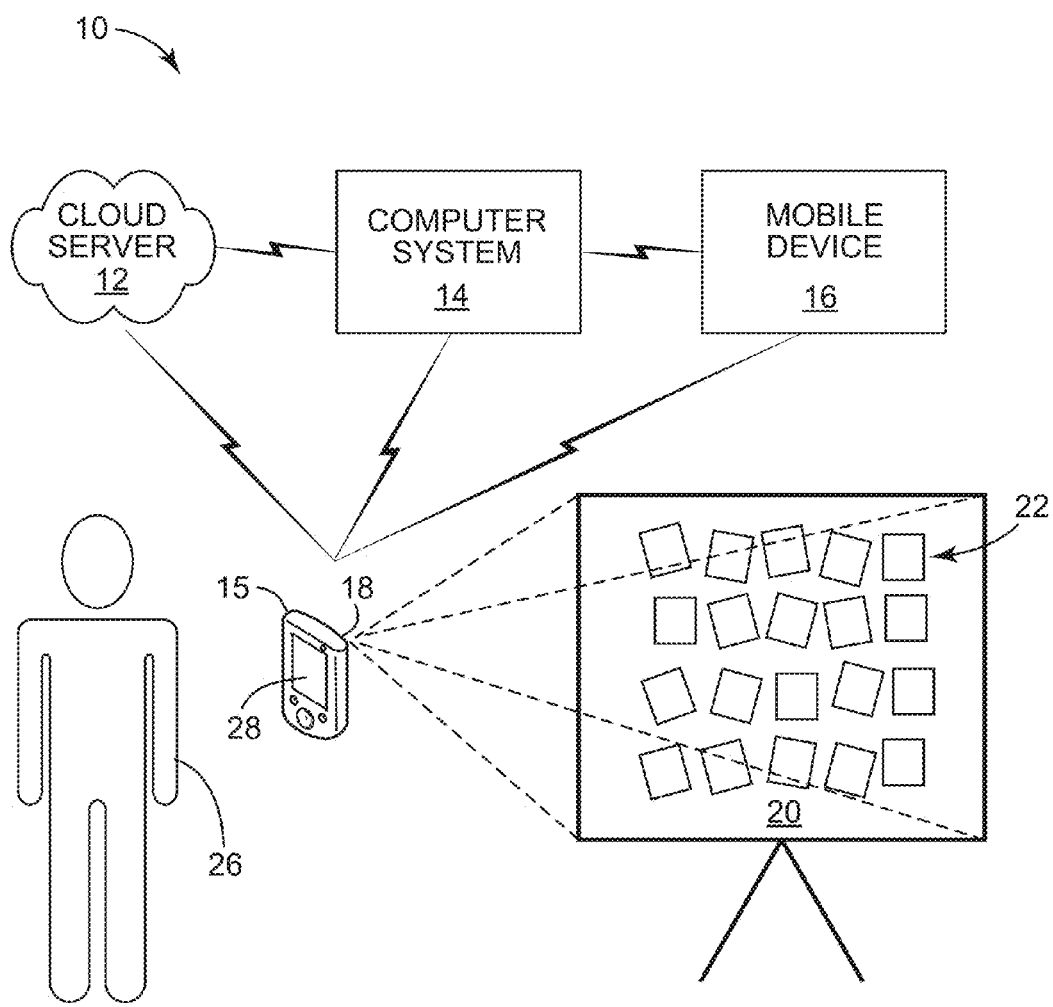
FIG. 1 is a conceptual diagram illustrating an example of a note recognition environment.

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes, such as storing, retrieving, editing, categorizing and/or grouping the digital notes, or the like. At least some aspects of the present disclose are directed to techniques for capturing notes with hints and manual assists.

In general, notes can include physical notes and digital notes. Physical notes generally refer to physical objects with a general boundary and recognizable content. Physical notes can include the resulting objects after people write, draw, or enter via other type of inputs on the objects, for example, paper, white board, or other objects accepting the inputs. By way of examples, physical notes can include hand-written Post-It® notes, paper, or film, white-board with drawings, posters, and signs. In some cases, physical notes can be generated using digital techniques, e.g., printing onto printable Post-It® notes or printed document. In some cases, one object can include several physical notes. For example, several ideas can be written on separate areas of a single piece of poster paper or a white-board. In some implementations, to facilitate the recognition of these notes, marks, such as lines, shapes, colors, symbols, markers, or stickers, can be applied to the edges of the notes. Physical notes can be two-dimensional or three dimensional. Physical notes can have various shapes and sizes. For example, a physical note may be a 7.62×7.62 cm (3×3 inches) note; a physical note may be a 66.04×99.06 cm (26×39 inches) poster; and a physical note may be a triangular metal sign. A physical note may also be a portion of a white board or poster paper with writing and/or drawing. In some cases, physical notes have known shapes and/or sizes. In some cases, physical notes may have known shapes and/or sizes that conform to standards, such as legal, A3, A4, and other size standards, and known shapes, which may not be limited to geometric shapes, such as stars, circles, rectangles, or the like. In other cases, physical notes may have non-standardized sizes and/or irregular shapes.

Digital notes generally refer to digital objects with information, data, text, images, and/or ideas. Digital notes can be generated using a computing device and/or digital inputs. A computing device can generate digital notes as digital representations of physical notes. For example, the content of a physical note can be represented as an image in the digital note. As another example, at least part of the content of a physical note can be represented by text in the corresponding digital note. Digital inputs can include, for example, keyboards, touch screens, digital cameras, digital recording devices, stylus, digital pens, or the like.

In some cases, digital notes may be representative of physical notes used in a collaboration space. Collaboration space generally refers to a gathering area allowing more than one person to brainstorm, such as sharing ideas and thoughts with each other. The collaboration space can also represent a virtual space allowing a group of persons to brainstorm, such as sharing ideas and thoughts remotely, besides the gathering area. The collaboration space may be referred to as workspaces, or the like.

FIG. 1 is a conceptual diagram illustrating an example of a note recognition environment 10. In the example of FIG. 1, environment 10 includes a mobile device 15 to capture and recognize one of more notes 22 from a workspace 20. As described herein, mobile device 15 provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In some examples, the plurality of physical notes 22 of workspace 20 may comprises notes of different colors. In other examples, the plurality of physical notes 22 of workspace 20 may comprise at least one note including fiducial markings, such as markings at the upper-right and lower-left corners of the note. In other examples, the plurality of physical notes 22 of workspace 20 may comprise at least one note having one color for the body of the note and another color for the border of the note. In other examples, notes from the plurality of physical notes 22 of workspace 20 may be arranged so that they overlap, such as being arranged in a stacked overlapping relationship. In other examples, notes from the plurality of physical notes 22 of workspace 20 may be arranged adjacently.

In the example implementation, mobile device 15 includes, among other components, an image capture device 18 and a presentation device 28. In addition, although not shown in FIG. 1, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. That is, the camera can capture an image depicting a visual representation of a scene having the plurality of physical notes, each of the physical notes having a predefined boundary and recognizable content thereon. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 15. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22. As further described below, mobile device 15 may implement techniques for automated detection and recognition of physical notes 22 and extraction of information, content or other characteristics associated with each of the physical notes. For example, mobile device 15 may allow user 26 fine-grain control over techniques used by mobile device 15 to detect and recognize physical notes 22. As one example, mobile device 15 may allow user 26 to select between marker-based detection techniques in which one or more of notes 22 includes a physical fiducial mark on the surface of the note or non-marker-based techniques in which no fiducial mark is used.

In addition, mobile device 15 can provide user 26 with an improved electronic environment for generating and manipulating corresponding digital notes representative of physical notes 22 including removing background or other image-related artifacts from the notes In some other cases, background or other image-related artifacts from the notes are kept in the digital notes. As another example, mobile device 15 may provide mechanisms allowing user 26 to easily add digital notes to and/or delete digital notes from a set of digital notes representative of the brainstorming activity associated with workspace 20. In some example implementations, mobile device 15 provides functionality by which user 26 is able to record and manage relationships between groups of notes 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 2:
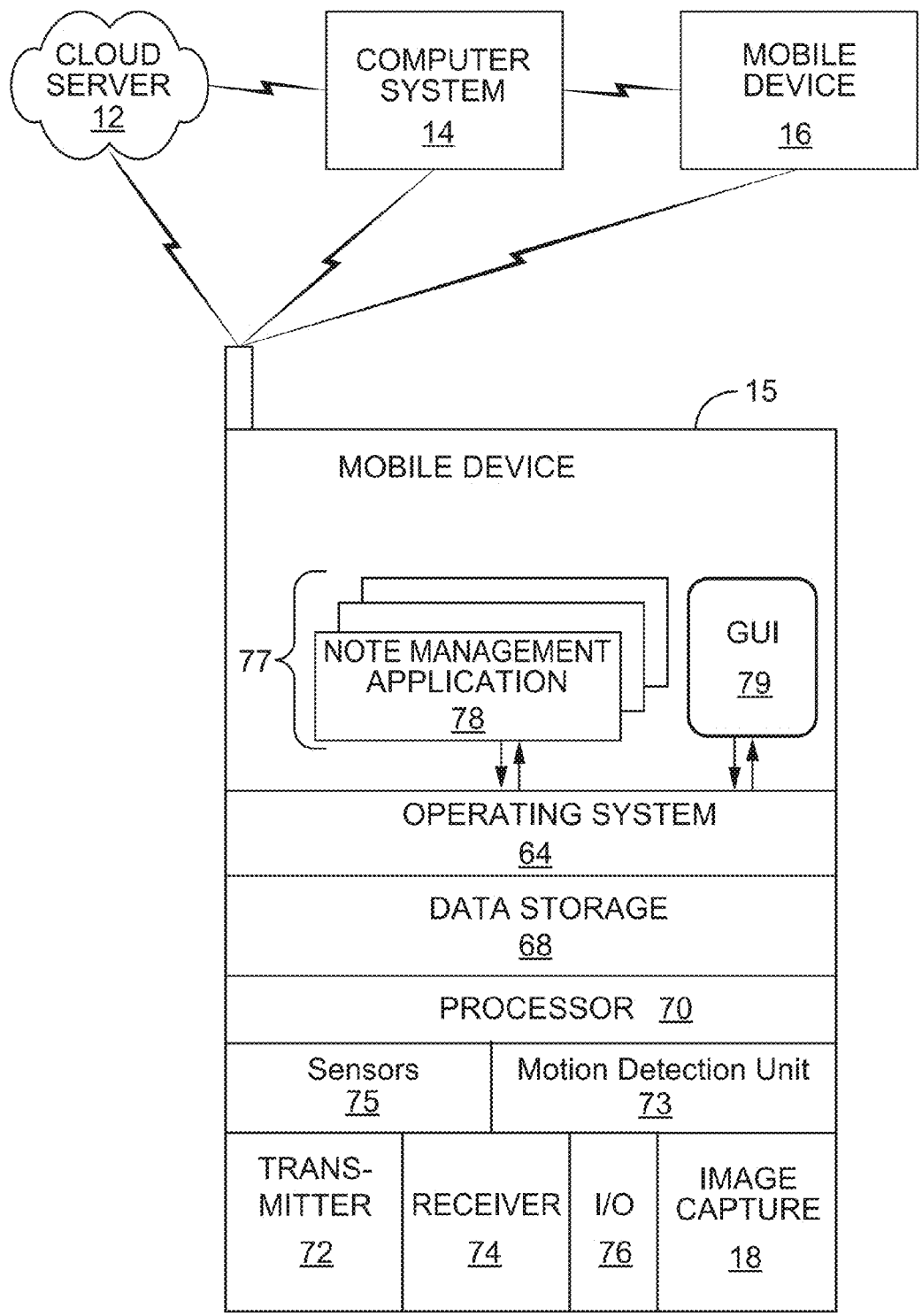
FIG. 2 is a block diagram illustrating an example of a mobile device capable of note management.

FIG. 2 is a block diagram illustrating an example of a mobile device that operates in accordance with the techniques described herein. For purposes of example, the mobile device of FIG. 2 will be described with respect to mobile device 15 of FIG. 1.

In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1. Transmitter 72 and receiver 74 provide wireless communication with other devices, such as cloud server 12, computer system 14, or other mobile device 16 as described in FIG. 1, via a wireless communication interface as described in FIG. 1, such as but not limited to high-frequency radio frequency (RF) signals. Mobile device 15 may include additional discrete digital logic or analog circuitry not shown in FIG. 2.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1 having notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 2, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include a mechanism that allows user 26 to easily add digital notes to and/or delete digital notes from defined sets of digital notes recognized from the image data. In some example implementations, note management application 78 provides functionality by which user 26 is able to record and manage relationships between groups of the digital notes by way of GUI 79.

The mobile device 15 can optionally include a motion detection unit 73 to detect movement of the mobile device 15 and/or the image capture device 18. The motion detection unit 73 can include various sensors, for example, motion sensors, accelerometers, gyroscopes, and the like. In some cases, the motion detection unit 15 can provide orientation, speed, distance, or the other relevant movement data. Such data can be used and processed by the note management application 78. In one embodiment, the note management application 78 can use the movement data to generate an operation hint (e.g., "hold still for better result", etc.) to a user on GUI 79.

The mobile device 15 can optionally include sensors 75 to detect and collect environmental data. For example, the sensors 75 can include optical sensor to detect and collect data regarding lighting condition. Such data can be provided to the note management application 78 to adjust the setting of the image capture device 18 (e.g., turn on the flash, etc.) and/or generate operation hint (e.g., "use flash for better result", etc.). Some external source, for example, external flash device, application controlling the lighting out of mobile device, or the like, can also be used to change the lighting condition. The sensors 75 can also include an accelerometer to determine how much shake or user induced motion exists while capturing and a hint such as "hold steady" or "use tap and hold capture" can be indicated to mitigate this effect. In addition, an optimized engine works on the live video stream to detect the physical notes. If the sizes of the detected notes are smaller than a pre-determined threshold, the user is urged to move closer to the physical notes.

Figure 3:
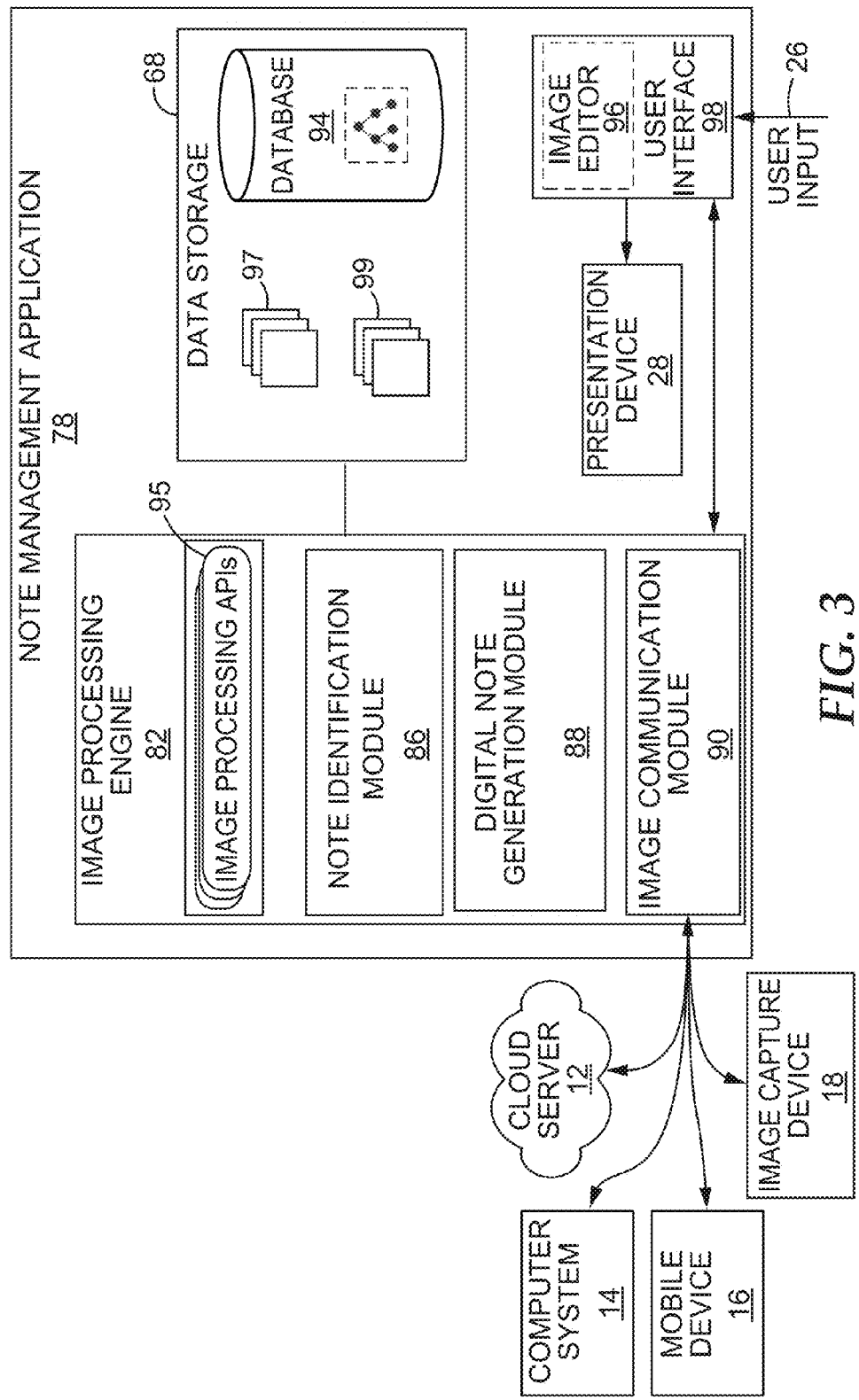
FIG. 3 is a block diagram illustrating one example implementation of a note management application.

FIG. 3 is a block diagram illustrating one example implementation of a note management application 78 that operates in accordance with the techniques described herein. Although described as a user application 77 executing on mobile device 15, the examples described herein may be implemented on any computing device, such as cloud server 12, computer system 14, or other mobile devices.

In this example, user application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1. Each of the images 97, also referred to as visual representations, may include one or more static images, animated images, a sequence of images, videos, or the like.

As described herein, note identification module 86 processes images 97 and identifies (i.e., recognizes) the plurality of physical notes in the images. The input image may be processed by note identification module 86 using marker and/or non-marker detection processes. Digital note generation module 88 generates digital notes 99 corresponding to the physical notes recognized within images 97. For example, each of digital notes 99 corresponds to one of the physical notes identified in an input image 97. During the recognition process, digital note generation module 88 may update database 94 to include a record of the digital note, and may store within the database information captured from the physical note within the input image as detected by note identification module 86 including, but not limited to: content, boundaries, color, size, shape, fiducial marks, or any combination thereof. Moreover, digital note generation module 88 may store within database 94 metadata associating the digital notes into one or more groups of digital notes.

Image communication module 90 controls communication of image data between mobile device 15 and external devices, such as cloud server 12, computer system 14, mobile device 16, or image capture device 18. In some examples, image communication modules 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 3, note management application 78 includes user interface 98 that constructs and controls GUI 79 (FIG. 2). As described below, user interface 98 may, in some examples, output for display an input image 97 overlaid with indications indicative of the plurality of digital notes 99, where each of the indication of a digital note is overlaid in place of a corresponding physical note. In addition, user interface 98 may display a group of visual representations of digital notes 99 that has been designated by the user. In some cases, the visual representation of a digital note, or referred to as an indication indicative of a digital note, can be a geometry shape with or without the note content of the corresponding note, where the geometry shape can be standardized shape or a shape corresponding to the actual shape of the note. In some implementations, an indication indicative of a digital note can include visual indicia of the corners of the note. This group of digital notes 99 may be, for example, a subset of the digital notes recognized in a particular input image 97. As another example, a group of digital notes 99 include notes that are associated with a same group via user operations. User interface 98 may display this designated group (set) of the digital notes on a second portion of GUI 79 and accept user input 26 to allow user to easily add or remove digital notes 99 from the designated group. In some cases, user interface 98 may display operation hints on a second portion of GUI 79 such that a user can follow operation hints to achieve better note capture and recognition results. In some cases, the graphical user interface 79 can include a touch sensitive device to accept user inputs. In some other cases, the user interface 79 can include more than one displays.

In some example implementations, user interface 98 provides an image editor 96 that allows a user to edit the overlay image and/or the digital notes. In another example, digital note generation module 88 may include one or more processes that enhance the extracted information from the input image.

Additional example details of note management application 78 for detecting and recognizing physical notes are described in U.S. Patent Application 61/844,140, filed Jul. 9, 2013, entitled "SYSTEMS AND METHODS FOR NOTE RECOGNITION AND MANAGEMENT USING COLOR CLASSIFICATION," U.S. Patent Application 61/844,152, filed Jul. 9, 2013, entitled "SYSTEMS AND METHODS FOR NOTE CONTENT EXTRACTION AND MANAGEMENT USING SEGMENTED NOTES," and U.S. Patent Application 61/844,176, filed Jul. 9, 2013, entitled "SYSTEMS AND METHODS FOR NOTE CONTENT EXTRACTION AND MANAGEMENT BY SEGMENTING NOTES," U.S. Patent Application 61/891,647, filed Oct. 16, 2013, entitled "NOTE RECOGNITION AND ASSOCIATION BASED ON GROUPING INDICATORS," U.S. Patent Application 61/891,444, filed Oct. 16, 2013, entitled "NOTE RECOGNITION FOR OVERLAPPING PHYSICAL NOTES," and U.S. Patent Application 61/891,442, filed Oct. 16, 2013, entitled "ADDING, DELETING DIGITAL NOTES FROM A GROUP OF DIGITAL NOTES," the entire contents of each of which are incorporated herein by reference.

FIG. 4A is a conceptual diagram illustrating an example note recognition process 100 as may be implemented by note management application 78 of mobile device 15. Initially, note identification module 86 of note management application 78 captures an input image of a plurality of notes through image acquisition (102). In some examples, the notes are physical notes and it is more efficient to capture more than one note at a time. Next, note identification module 86 recognizes one of the plurality of notes from the input image (104). For example, note identification module 86 may recognize note features using a color detection module, a shape detection module, and a pattern detection module, and subsequently determine the general boundary of the note.

Digital note generation module 88 extracts content of the one of the plurality of notes to create sub-images (106). In some examples, digital note generation module 88 can apply image transformation to at least part of the input image before extracting content. In some other examples, digital note generation module 88 can apply image enhancement or another image processing technique, such as removing a background of the underlying workspace or changing the color of each note in the plurality of notes to improve the quality of the extracted content or sub-images (108). In yet other examples, digital note generation module 88 can further recognize text and figures from the extracted content or sub-images. Digital note generation module 88 stores the enhanced extracted content or sub-images to data storage 68 of mobile device 15, and may transfer the digital notes to cloud server 12 or other computer system 14 (110). At this time, the system may create a respective digital note representative of a corresponding one of the recognized physical notes. The system may associate the content extracted from the visual representation for a given physical note with the corresponding digital note representative of the physical note. Program code or other executable instructions for causing a programmable processor to perform process 100 may be stored within a computer-readable storage of mobile device 15.

Figure 4B:
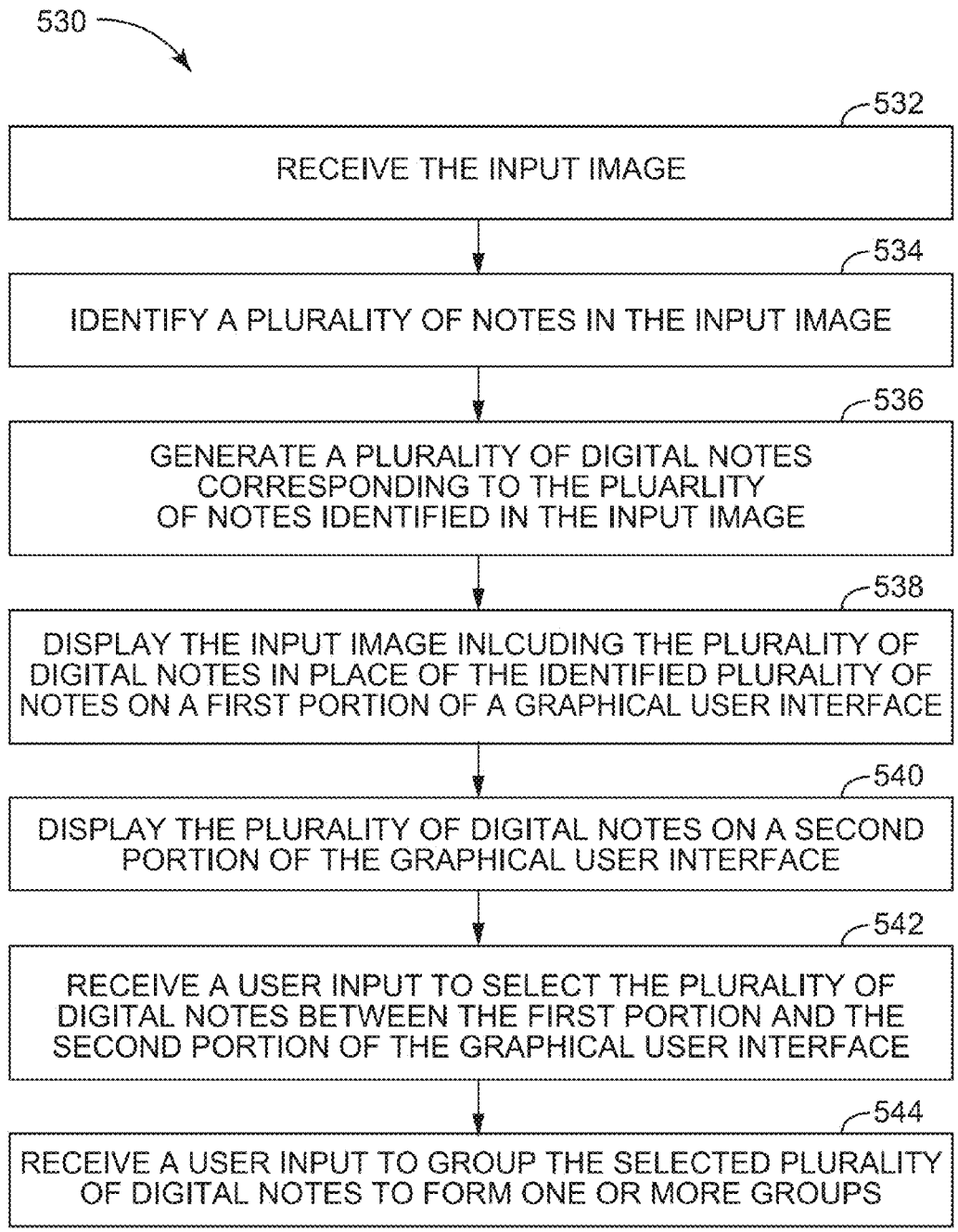
FIG. 4B is a conceptual diagram illustrating example operation of a note management application.

FIG. 4B is a conceptual diagram illustrating example operation of a note management application 78 when, in response to user input, selecting a plurality of digital notes in the first portion of the graphical user interface or the second portion of the graphical user interface and grouping the selected plurality of digital notes. In one example of process 530, note management application 78 executing on a computing device, mobile device 15, cloud server 12, or computer system 14, as described in FIGS. 1-3, receives an input image (532). Next, the computing device is configured to identify a plurality of notes in the input image (534). Upon identifying the plurality of notes in the input image, the computing device generates a plurality of digital notes corresponding to the plurality of notes identified in the input image (536). After generating the plurality of digital notes, the computing device is configured to display the input image including the plurality of digital notes overlaid thereon in place of the identified plurality of notes on a first portion of graphical user interface (538). Optionally, upon displaying the first portion, the computing device is also configured to display the plurality of digital notes on a second portion of the graphical user interface (540). Next, the computing device is configured to receive a user input to select at least some of the plurality of digital notes by way of the graphical user interface (542). After receiving the user input to select some of the plurality of digital notes, the computing device is also configured to receive a user input to group the selected plurality of digital notes to form one or more groups (544).

In some cases, the one or more groups may include a hierarchical order. For example, groups in level 1 (e.g., Group 11, Group 12, Group 13, etc.) are at the highest level. Groups in level 2 (e.g., Group 21, Group 22, Group 23, etc.) are at a level below groups in level 1 and can be associated with the groups in level 1 (e.g., Group 11 includes Group 21 and Group 22; Group 12 includes Group 23). Groups in level 3 (e.g., Group 31, Group 32, Group 33, etc.) are at a level below groups in level 2 and can be associated with the groups in level 2 (e.g., Group 21 includes Group 31, Group 32, and Group 33). Group 31 includes Note 1, Note 2, and Note 3; and Group 32 includes Note 4, Note 5, and Note 6. In the example above, Note 1 is associated with Group 31, Group 21, and Group 11; and Note 4 is associated with Group 32, Group 21, and Group 11.

Figure 4C:
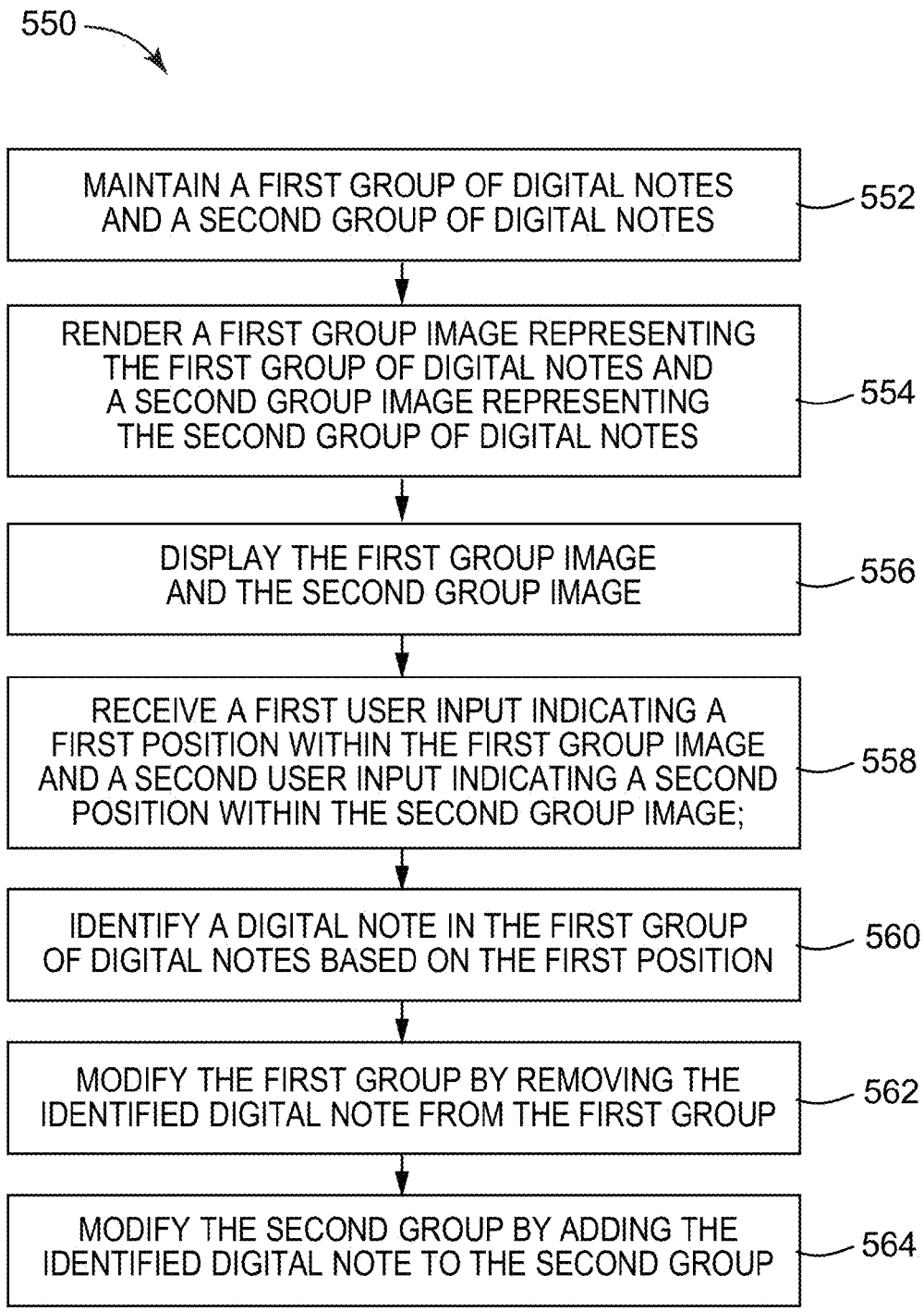
FIG. 4C is a conceptual diagram illustrating an example note association process.

FIG. 4C is a conceptual diagram illustrating an example note association process 550 of the note management application 78 when, in response to user input, moving one note from one group to another group. In one embodiment of the process 550, the note management application 78 running on a computer device maintains a first group of digital notes and a second group of digital notes (552). Next, the computing device renders a first group image representing the first group of digital notes and a second group image representing the second group of digital notes (554). A group image typically has a boundary indicating a group and a name for the group. The GUI accepts user input to create a name for the group. It can also have a specific background color to indicate the group. Alternatively, the borders of each note in a group can be colored with one color, and the borders of notes belonging to another group could be colored with a different color. In some implementations, a group image can include visual representations of all digital notes in the group. In some other implementations, a group image can include visual representations of some of the digital notes in the group. In some cases, a group image has a grid format where the visual representations of the digital notes are arranged in a grid.

The computing device displays the first group image and the second group image on the graphical user interface (556). The computing device further receives a first user input indicating a first position within the first group image and a second user input indicating a second position within the second group image (558). The user inputs can be received via the graphical user interface. In some cases, the graphical user interface includes a touch sensitive device having a touch sensitive area configured to detect position information of stimuli proximate to the touch sensitive area. The computing device identifies a digital note in the first group of digital notes based on the first position (560). Then, the computing device modifies the first group by removing the identified digital note from the first group (562); and modifies the second group by adding the identified digital note to the second group (564).

After changing the note groups, the computing device can render a modified first group image representing the modified first group and a modified second group image representing the modified second group. In some cases, the identified digital note is rendered proximate to the second position within the modified second group image. Additionally, the size of the modified first group image may be reduced for the one less member in the group and the size of the modified second group image may be enlarged to accommodate one more member in the group.

Figure 5A:
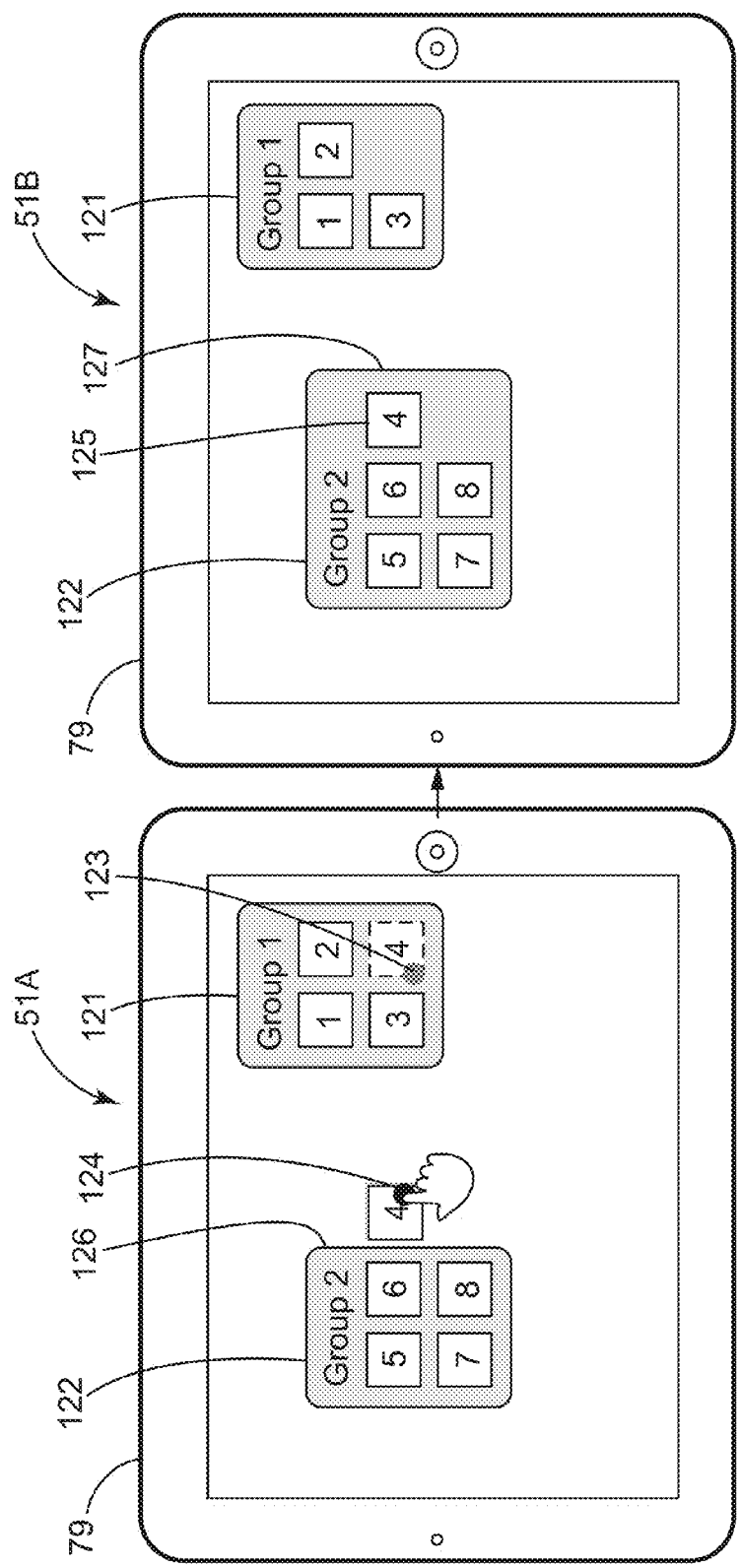
FIGS. 5A-5G are conceptual diagrams illustrating example operations of the note association process.

FIGS. 5A-5G are conceptual diagrams illustrating some example operations of the note association process 550. In FIG. 5A, a group image 121 includes visual representations of digital notes (Note 1, Note 2, Note 3, Note 4) in Group 1 and a group image 122 includes visual representations of digital notes (Note 5, Note 6, Note 7, Note 8), as illustrated by 51A. The graphical user interface 79 receives a user input at 123 that is proximate to the original position of Note 4. The graphical user interface 79 further receives a user input at 124 that is proximate to the group image 122. The computing device based on the user input at 123, identifies Note 4, removes Note 4 from Group 1 and adds Note 4 to Group 2. In this example, the group images 121 and 122 have a grid format. The computing device further adds Note 4 to the group image 122 at the grid location 125 that is proximate to the position 124, as illustrated by 51B. In some cases, the relative position of a digital note in a group image is generated and stored in a non-transitory computer readable medium, for example, in the data associated with the digital note. In some cases, the group image 122 has an original boundary located at 126 and is expanded to location 127 to accommodate the additional Note 4. In some implementations, instead of moving one note from Group 1 to Group 2, the computing device can copy the note to Group 2.

Figure 5B:
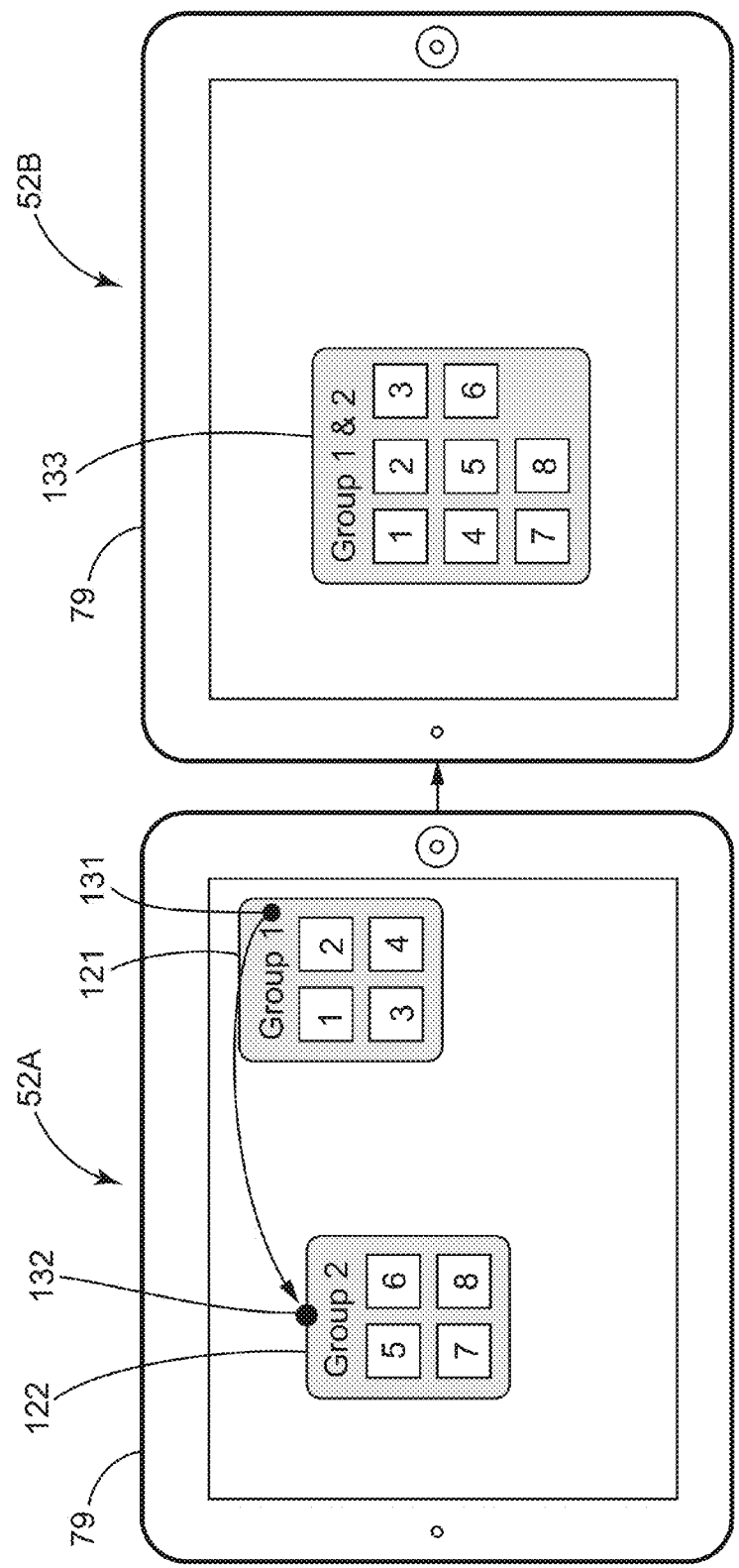

FIG. 5B is a conceptual diagram illustrating an example process of merging groups. The graphical user interface receives a user input at position 131 proximate to boundary of the group image 121 and later a user input at position 132 within the group image 122, as illustrated in 52A. The computing device can merge the two groups of digital notes (Group 1 and Group 2) into one group. The representation of the modified group is shown as 133 in 52B, for example.

Figure 5C:
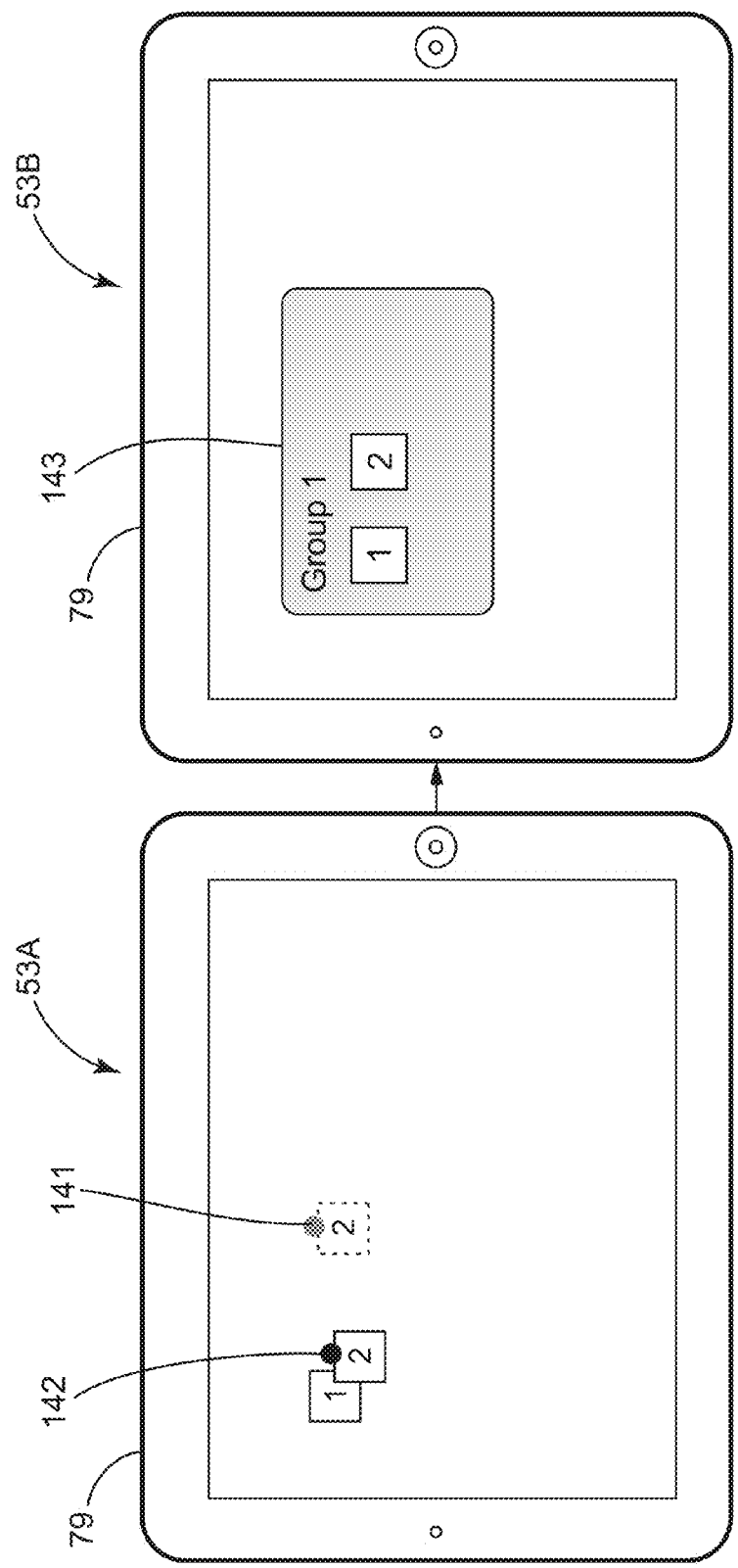

FIG. 5C is a conceptual diagram illustrating an example process of group creation. The graphical user interface receives a user input at position 141 proximate to visual representation of Note 2 and later a user input at position 142 proximate to visual representation of Note 1, as illustrated by 53A. The computing device can create a Group 1 including the digital notes corresponding to Note 1 and Note 2. The group image for Group 1 is illustrated as 143 in 53B.

Figure 5D:
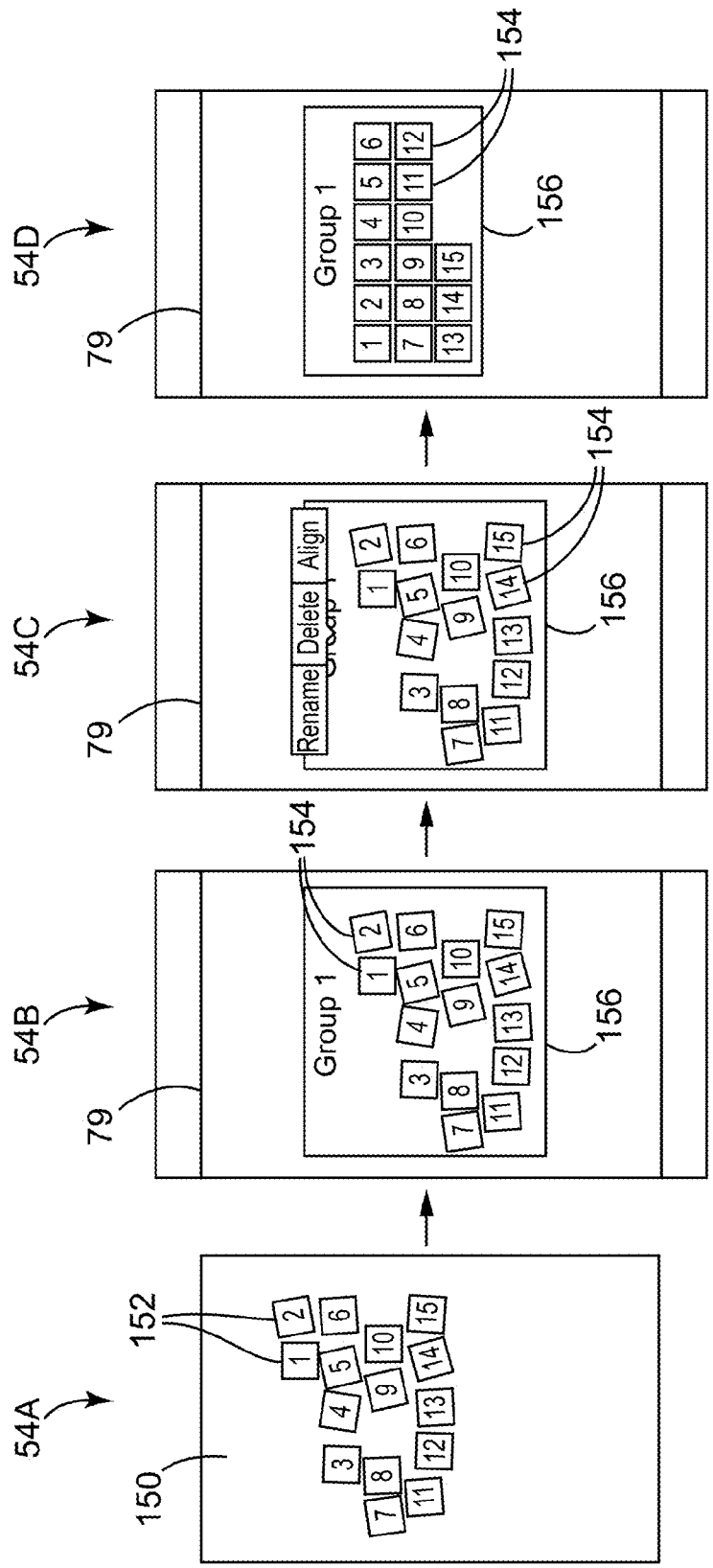

FIG. 5D is a conceptual diagram illustrating another example process of group creation. 54A illustrates a plurality of notes 152 attached to a supporting structure 150. 54B is a captured image of 54A presented on a graphical user interface 79. As an example, a group (e.g., Group 1) can be created to include all digital notes 154 representing the notes 152 capture in this single image. Further, visual representations of digital notes within a group image 156 can maintain their spatial position in the original captured image as illustrated by 54B, to help users remember how the notes looked in the collaboration environment, for example. Keeping the original spatial position may help determine if there are more than one group of notes in a single captured image. When the graphical user interface 79, in response to a user input as illustrated by 54C, can provide operation options of the group on the GUI, for example, align, rename, delete, add, and the like. For example, the user may select the "align" option and the visual representations of digital notes 154 are aligned in the group image 156.

Figure 5E:
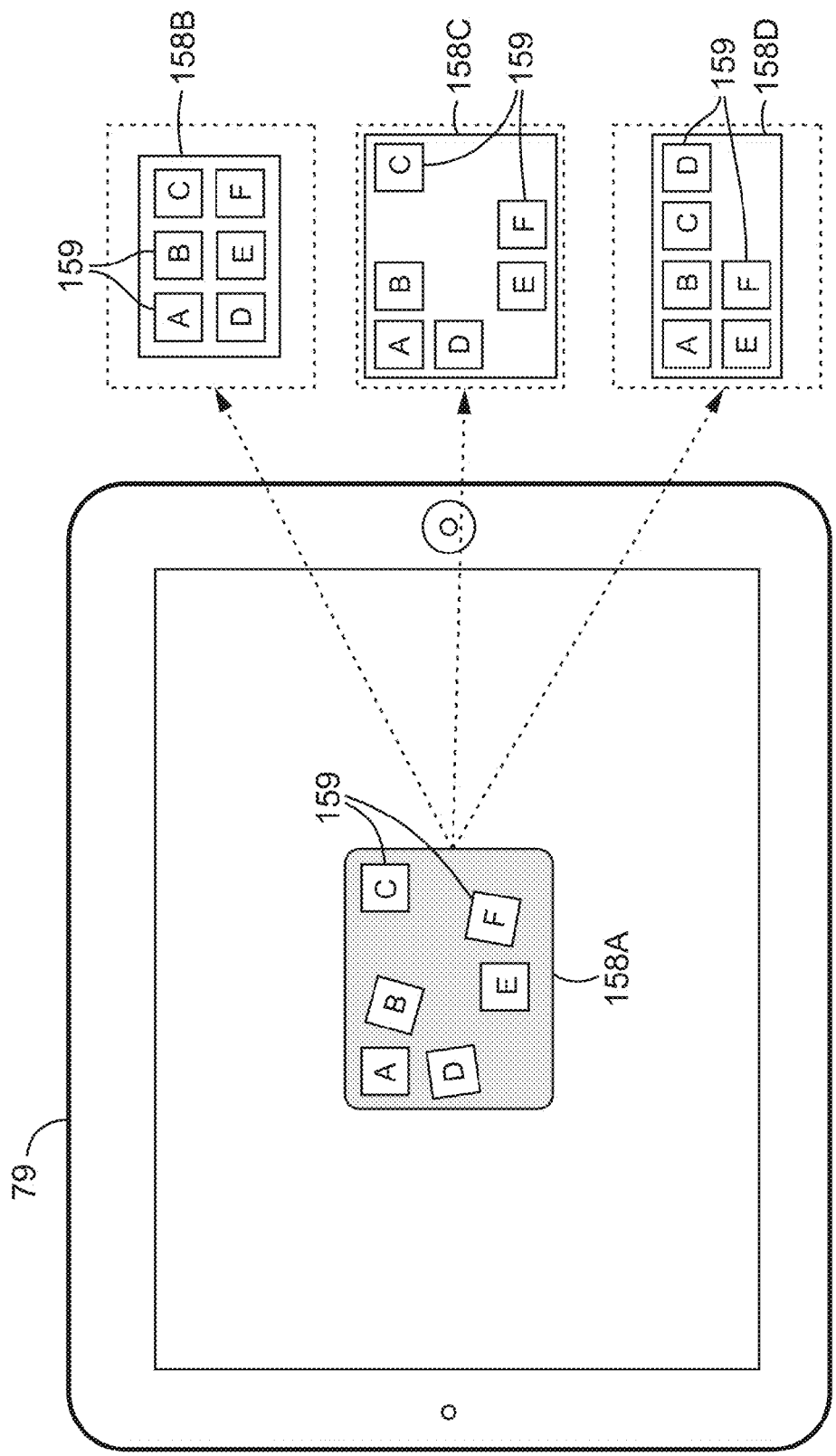

FIG. 5E illustrates some alignment options. 158A is a free form group image, which represents the spatial positions of the physical notes. The computing device can generate group images with different notes alignments and arranges, either automatically or in response to user input. For example, 158B is a fitted group image; 158C is a group image where the individual visual representations of digital notes 159 are snapped to grid; and 158D is a group image that is generated by automatic layout, for example. In some cases, in the group image of 158B, the spatial positions of the digital notes within the grid can correspond to the spatial positions of the physical notes.

Figure 5F:
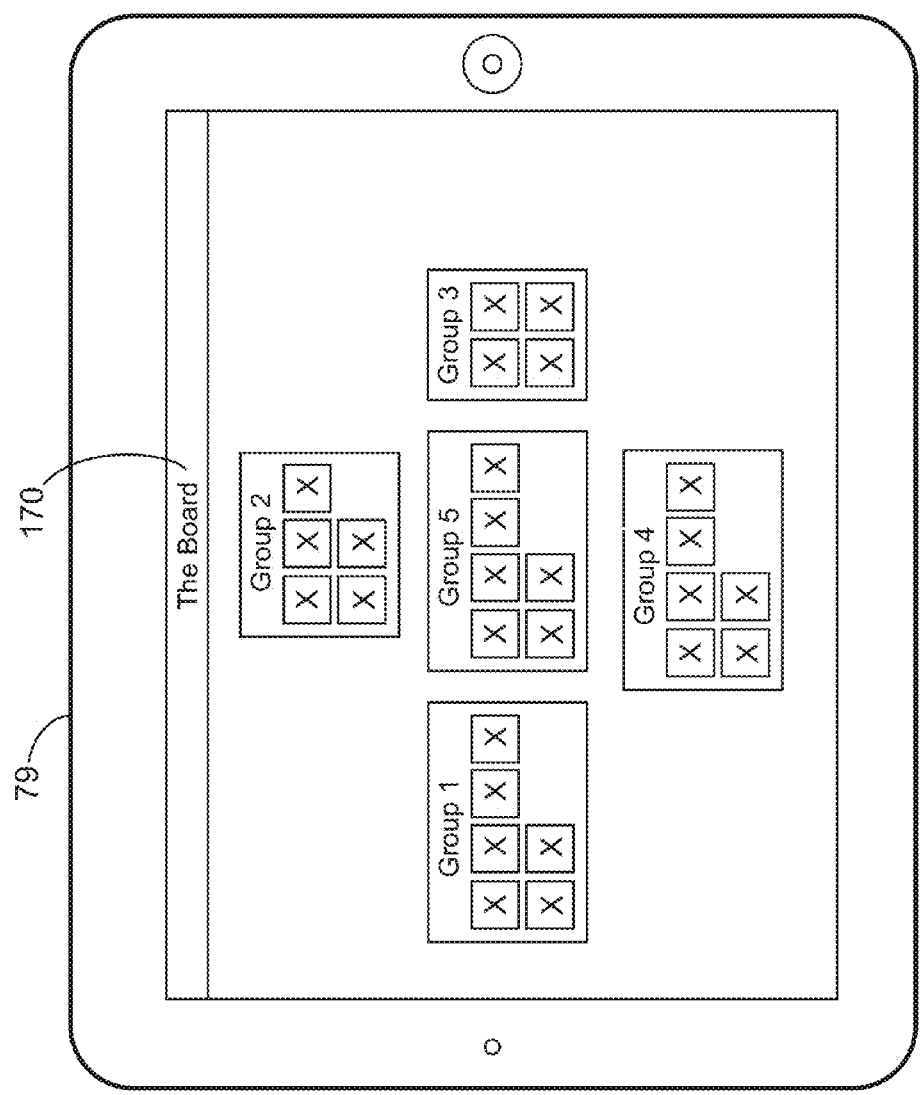

FIG. 5F illustrates an example of a board image. A board, also referred to as a worksheet or a sheet, refers to a second level group that includes groups (e.g., Group 1, Group 2, Group 3, Group 4, and Group 5). The board image 170 includes the group images of the containing groups. In some cases, a board can be created with a single captured image (e.g., a static image, a sequence of images, a video clip, etc.). In such cases, groups can be formed based on the spatial location of notes, grouping indicators, properties of notes, or the like.

Figure 5G:
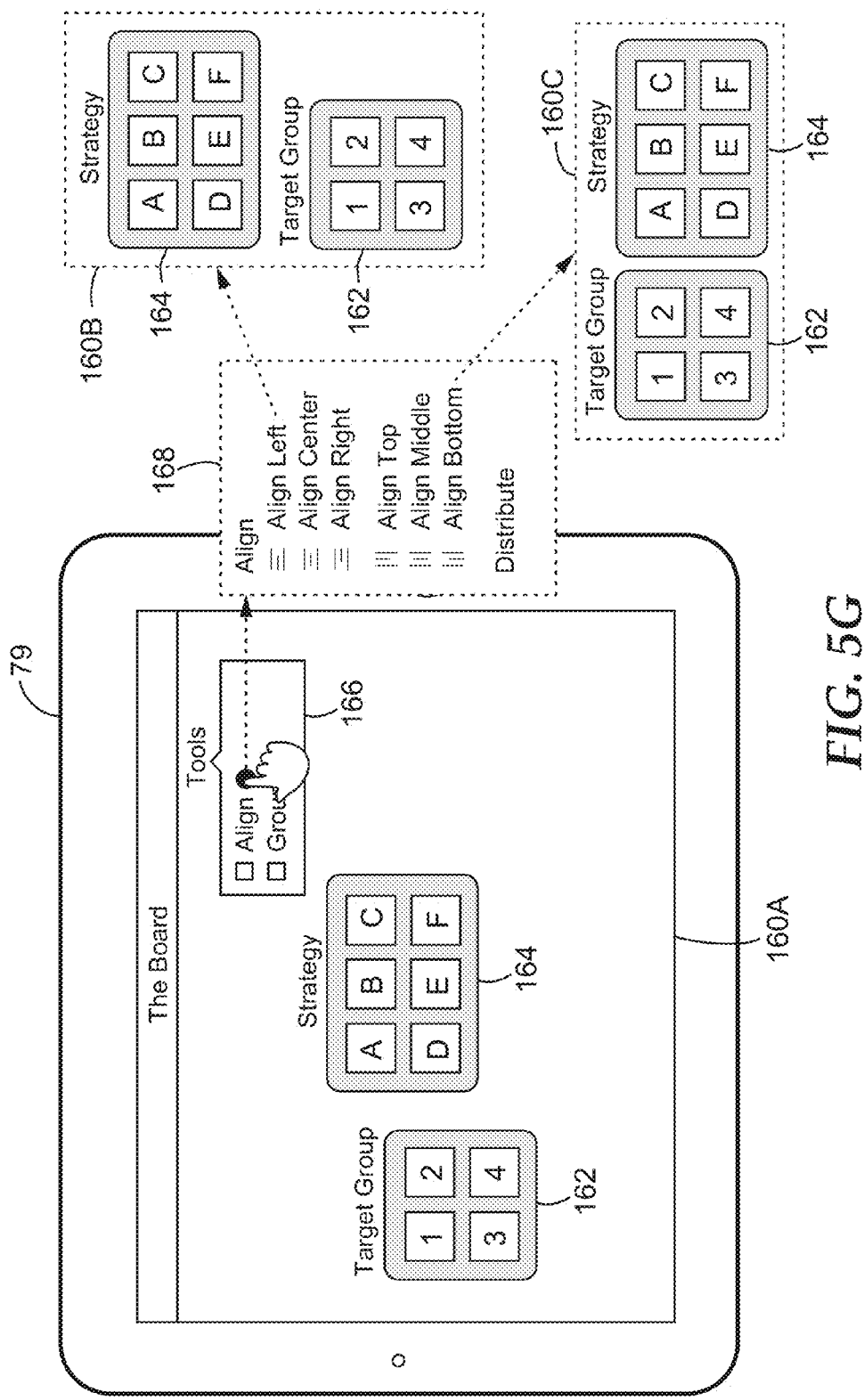

FIG. 5G illustrates alignments of group images in a board image. A board image 160A includes a group image 162 and a group image 164. In response to a user input, for example by user selecting from manual 166 and 168, a board image 160B (partial view) can be presented on the GUI 79 where the group image 162 and the group image 164 have a horizontal alignment on the left; or a partial board image 160C (partial view) can be presented on the GUI 79 where the group image 162 and the group image 164 have a vertical alignment at the bottom.

In some cases, a "double tap" on a note can create a new copy of the note which can be clicked and dragged to a new group. Double tap on a group can create a copy of the group. In some cases, grouping can also be achieved by touching and dragging the group boundary to include new notes. Alternatively, by clicking and dragging a bounding rectangle or drawing a loop/circle around notes using stimuli (e.g., finger, stylus, etc.) on a touch sensitive device, a group can be created. In some implementations, new notes are captured and presented on the GUI and the new notes can be added to the existing groups, for example by connecting subsequent loops/circles/rectangles around new notes, to the group images.

In some cases, a group can be created, upon receiving user input, with one or more notes. For example, a note can be dragged out of a group image and the computing device can create a new group for the note. As another example, a plurality of notes can be selected in a group image, in response to user input, and dragged out of the group image and the computing device can generate a new group for the plurality of notes. In some other cases, a group can be created based on each capture action. For example, the computing device may capture one static image of four notes, and then create a group having the four notes. As another example, the computing device may capture a sequence of images or a video clip of twenty notes, and then create a group having the twenty notes. In yet another example, the computing device may capture four images where each image has the visual representations of several notes, and then create four groups corresponding to the content of the four images. One note may also be captured and left alone and not be combined with other notes. Alternatively, one note can be removed from a group and become a standalone note.

Figure 6A:
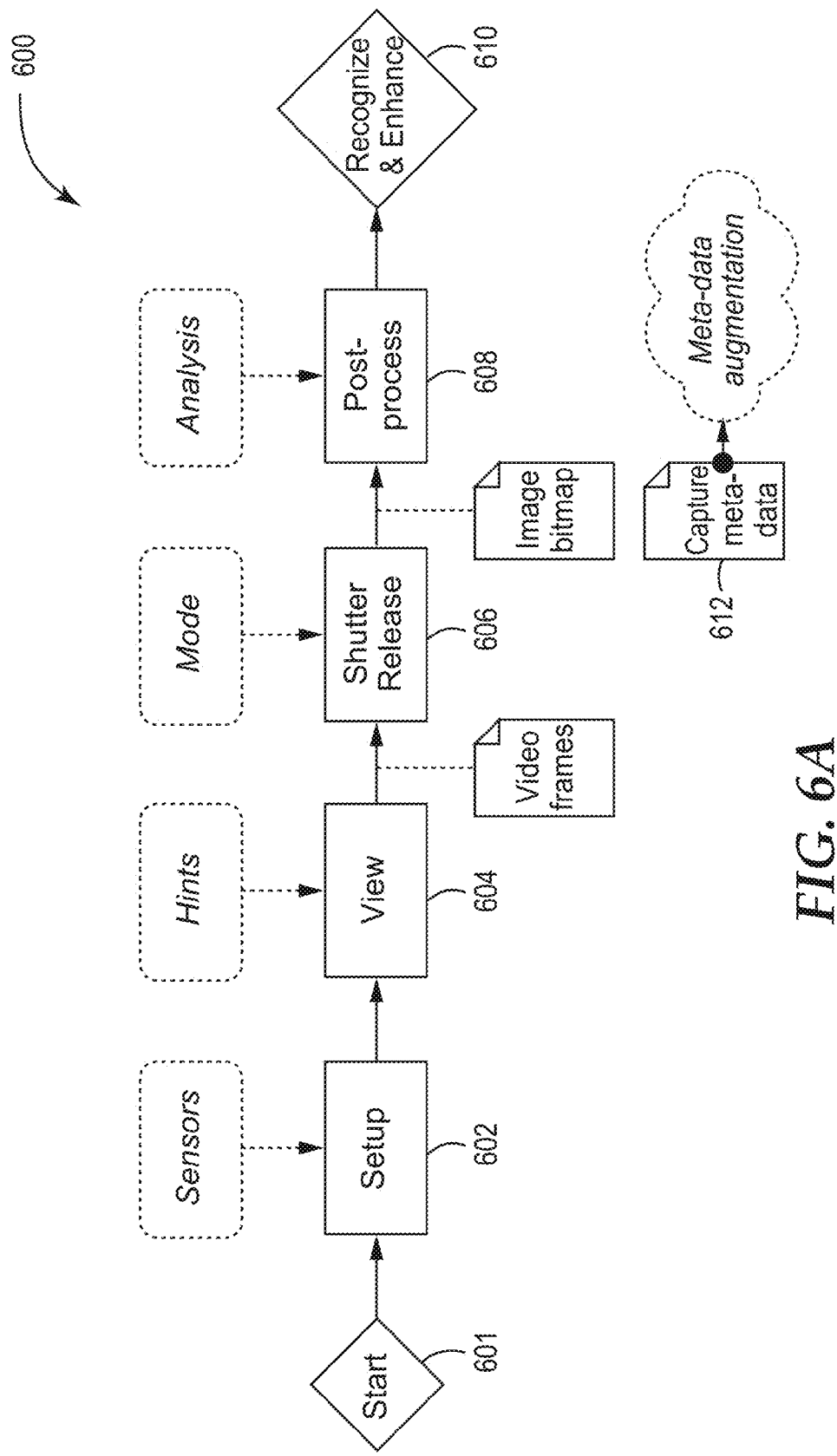
FIG. 6A is a conceptual diagram illustrating an example process of a note management application for providing hints for better note capture.

FIG. 6A is a conceptual diagram illustrating an example process 600 of the note management application 78, running on a computing device, and providing hints for better note capture. The hint generation process can be implemented by, for example, in the note identification module 86. First, the note management application 78 starts to run (601). The sensors (e.g., image sensor, light sensor, motion sensors, etc.) are set up or activated (602). The sensors electronically communicate with the one or processors in the computing device where the note management application 78 is executed. For example, the sensors include a light sensor to measure luminosity. If luminosity is less than a pre-determined threshold, a warning message is displayed.

In some cases, the sensors are integrated with the computing device. For example, a smart phone has a camera and an accelerometer. Next, the computing device presents a visual representation of notes and hints for better note capture (604). In some embodiments, the image capturing device is set to a video mode and video frames are captured, where at least a subset of the video frames are analyzed. In some other embodiments, static image(s) can be captured for analysis.

Based on the analysis, hints may be generated and presented to users regarding the note capturing process including, for example, distance of the image capture device to physical notes, alignment of the image capture device, motion of image capture device, lighting condition, and the like. As another example, a hint of "hold to capture" can be provided when the tap and hold function is provided. In some cases, the visual representation of notes and the hints are presented at different portions of the graphical user interface. In some other cases, the hints can include audio and/or visual information. For example, the hints can be provided as audio messages. As another example, the hints can include one or more text messages, static images, animated images, and other visual information. In some cases, the hints are generated and presented to the user in a real-time manner (e.g., presented within 5 seconds of video capture).

The image capture device (e.g., a camera) can be set to certain mode (606) with or without user input. For example, the image capture device can include a normal mode to capture images (e.g., static image or sequence of images). As another example, the image capture device can include a burst mode where many images are captured and the best image is select, when a user tap and hold the capture button, for example. In yet another example, the image capture device includes a tap and hold mode when the capture button is tapped and held for a period of time before a single image is captured.

After an input image is captured, the computing device may post-process the image (608). For example, the computing device may select the best image from several images captured in rapid succession based on based on criteria such as image sharpness, color range, exposure time, and/or the like. The computing device may use sensor fusion technique by combining information from several sensors, for example, the gyro and the accelerometer, such that the total motion of the device when an image is captured can be obtained. The motion information can be used to reduce motion blur in the captured image before it is processed by the note recognition step. Some devices may additionally have built-in motion compensation in the image sensors. Captured images can be further post-processed before entering the recognize step, for example, by normalizing the ranges of the color channels and other such techniques. These processes may rely on metadata from the capture such as ISO value, focus settings, etc.

In some embodiments, metadata 612 that is retrieved from various sensors and/or the image capture device is used in note identification and extraction. The metadata includes, for example, exposure time, brightness, focus point of interest, ISO speed, and the like. This meta-data can be used to achieve better results in note detection and enhancement. For example, the brightness of the image can be used to determine the actual color of a region of the image. As another example, the focus point of interest might be used as input to a noise reduction algorithm. The computing device further recognizes and enhances notes and creates corresponding digital notes using the input image that may or may not be post-processed, with or without the metadata (610).

Figure 6B:
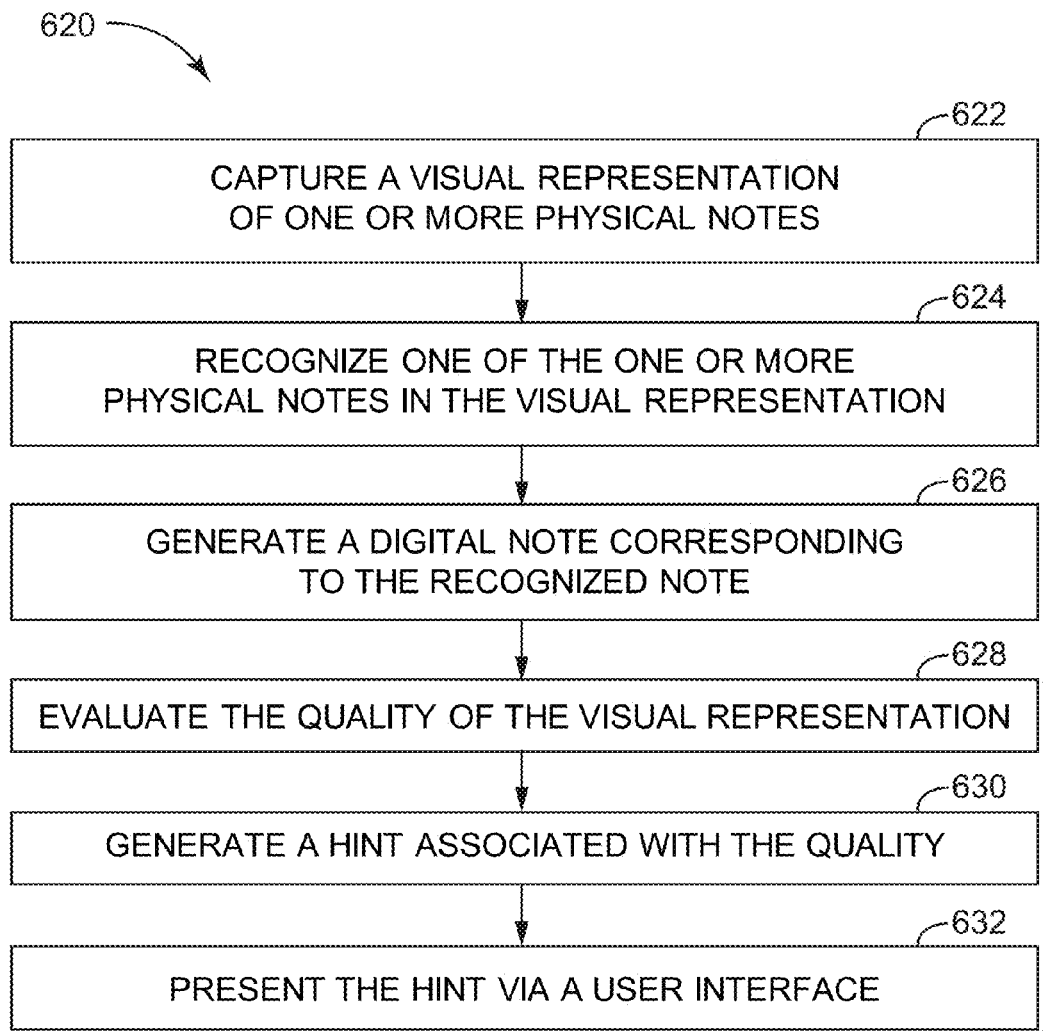
FIG. 6B is a conceptual diagram illustrating an example hint generation process to generate and present hints during note capturing.

FIG. 6B is a conceptual diagram illustrating an example hint generation process 620 to generate and present hints during note capturing. First, the computing device captures a visual representation of one or more physical notes (622). The visual representation can be in the format of static image, a sequence of images, or video. The computing device then recognizes one of the one or more physical notes in the visual representation (624) and generates a digital note corresponding to the recognized note (626). In some cases, the computing device can use a speed-optimized detection algorithm to generate the digital note. For example, the digital note may only contain the approximate boundary of the physical note. The computing device evaluates the quality of the visual representation (628) and generates a hint associated with the quality (630). The computing device can present the hint via the user interface (632). In some embodiments, the hint generation process can run continuously to analyze the capture conditions and provide users live feedback.

Figure 7A:
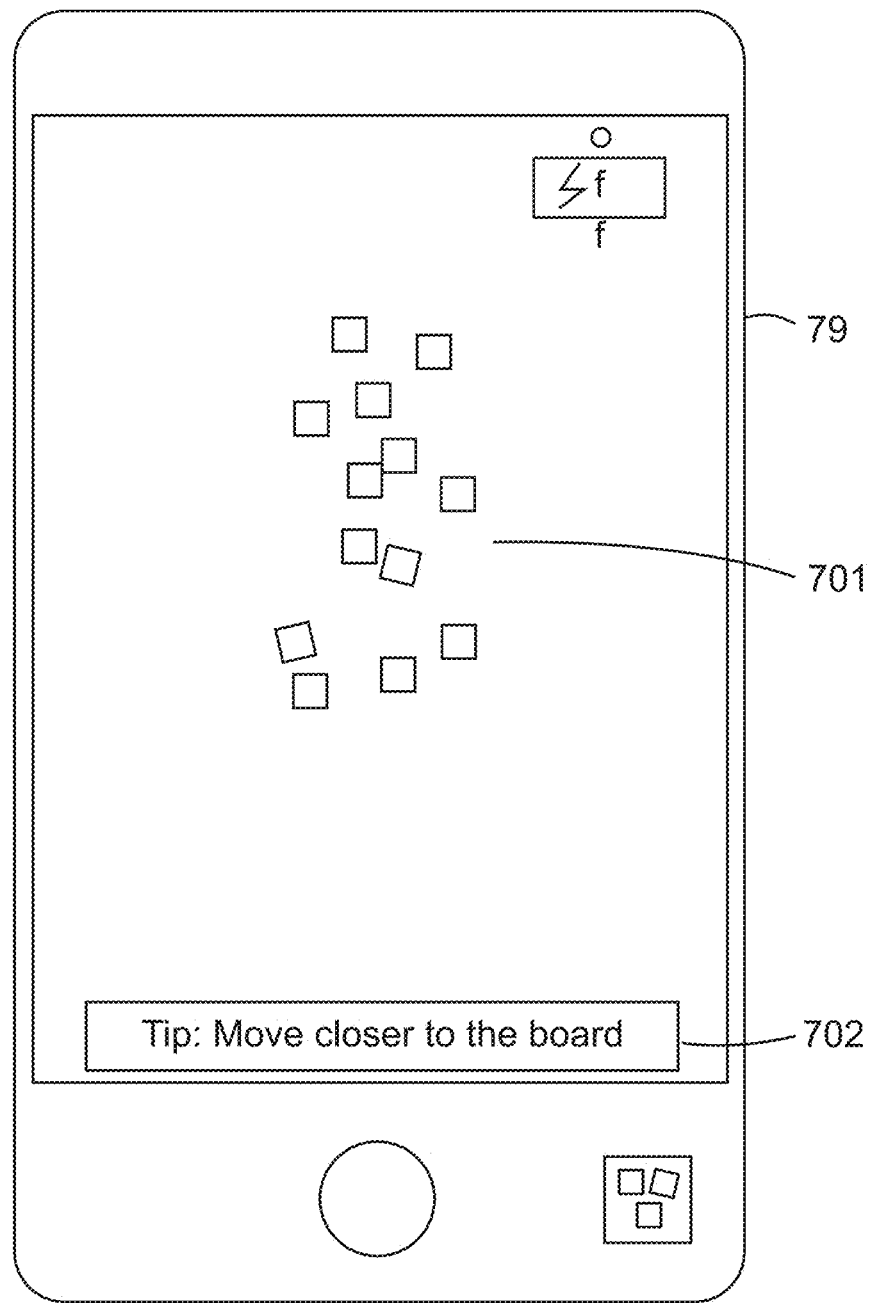
FIGS. 7A-7F are conceptual diagrams illustrating examples of the hint generation process.

FIGS. 7A-7F are conceptual diagrams illustrating examples of the hint generation process 620. In FIG. 7A, a hint regarding distance between the image capture device and the notes is presented. In some cases, during the acquisition process the frames from the video presentation of the camera, acquisition field of view are processed by a limited high speed version of the note extraction engine to determine the size of the notes in the field of view. If the size is too small, the user is urged to move closer to the notes. In general, the farther away from the camera the notes are, the smaller they will appear in the captured picture, which yields lower quality results. In the example illustrated in FIG. 7A, the visual representation of the notes is presented in part 701 of the GUI 79 and the hint is presented in part 702 of the GUI 79. In some cases, parts 701 and 702 can be overlapped. In some other cases, part 702 can be within part 701 of the GUI 79.

Figure 7B:
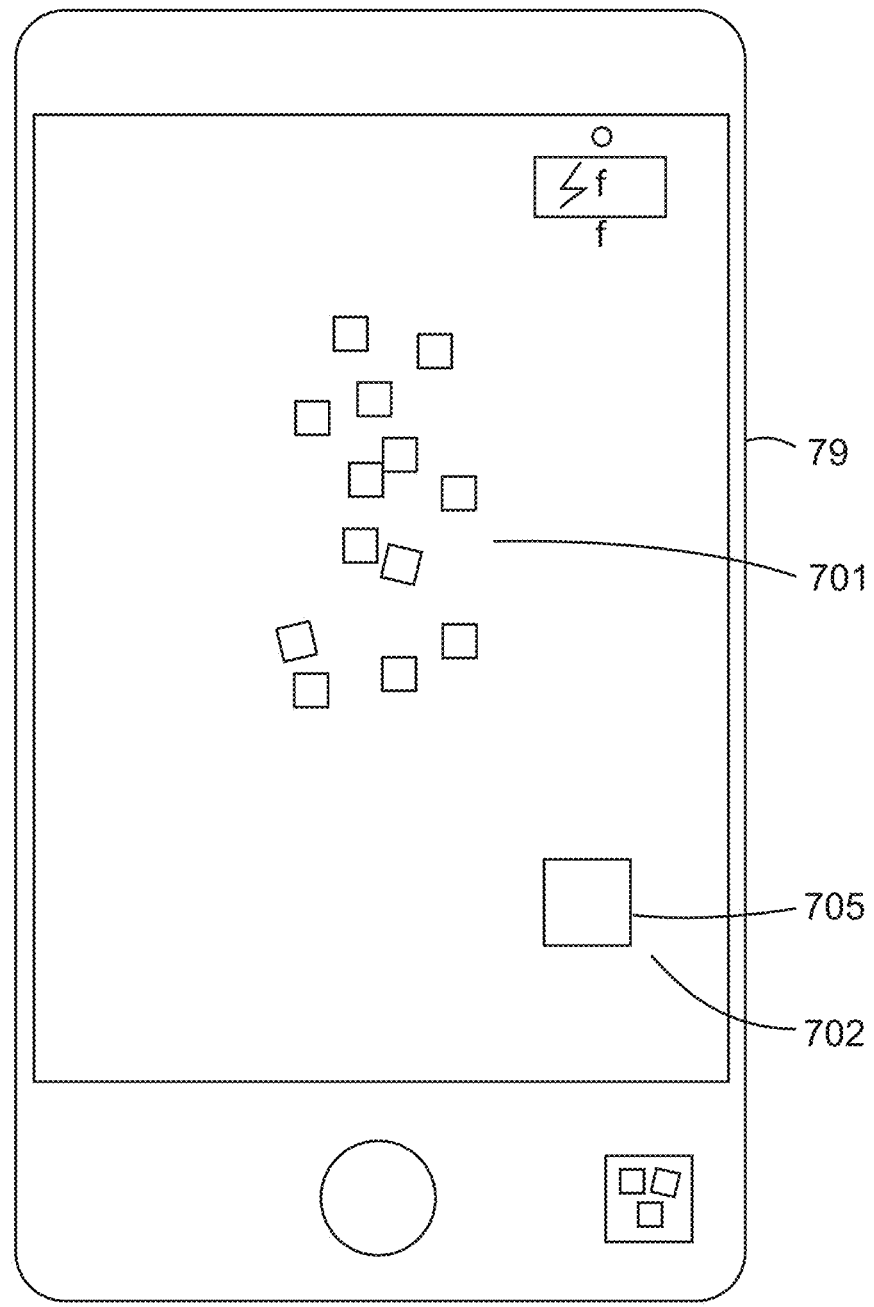

Referred to FIG. 7B, a hint can be a visual representation of note 705 indicating the threshold or desired size to be displayed on the GUI 79. The hint is presented in part 702 which is part of the part 701. The visual representation of note 705 can be, for example, a static image with different color from the background, an animated image of a note, or the like.

Figure 7C:
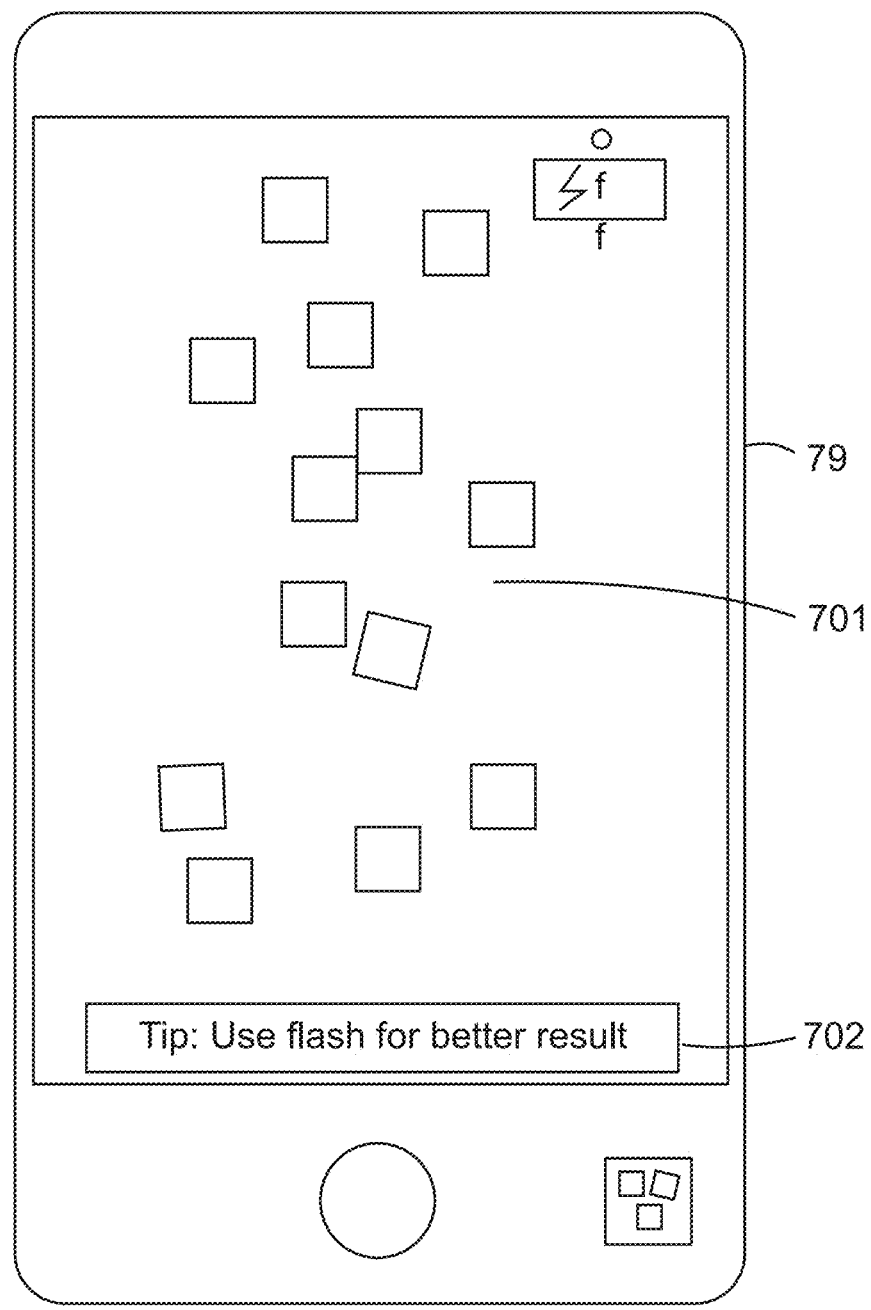

In FIG. 7C, a hint regarding lighting condition is presented. If there is not enough light when taking a picture, the picture will be noisy and colors will be less vivid. In some cases, image sensing setting of the image capture device is evaluated and a hint is generated regarding lighting condition. For example, to aid the user in taking pictures with sufficient lighting, the automatically set ISO (International Standards Organization) value is examined when the viewfinder is active. If the ISO value is above a predetermined threshold, the user is urged to use the flash, or to turn on lights. In some implementation, automatic control of the flash can be tied to this hint. Other settings for the image capture device can also be assessed to determine the lighting conditions. For example, the color setting can be assessed when the color of the captured image and/or a specific object (e.g., a note) in the capture image does not match the designated color. In some embodiments, the noise level of the captured visual representation (e.g., static image, video frame, etc.) can be analyzed and the hint regarding lighting condition can be generated based on the analysis.

Figure 7D:
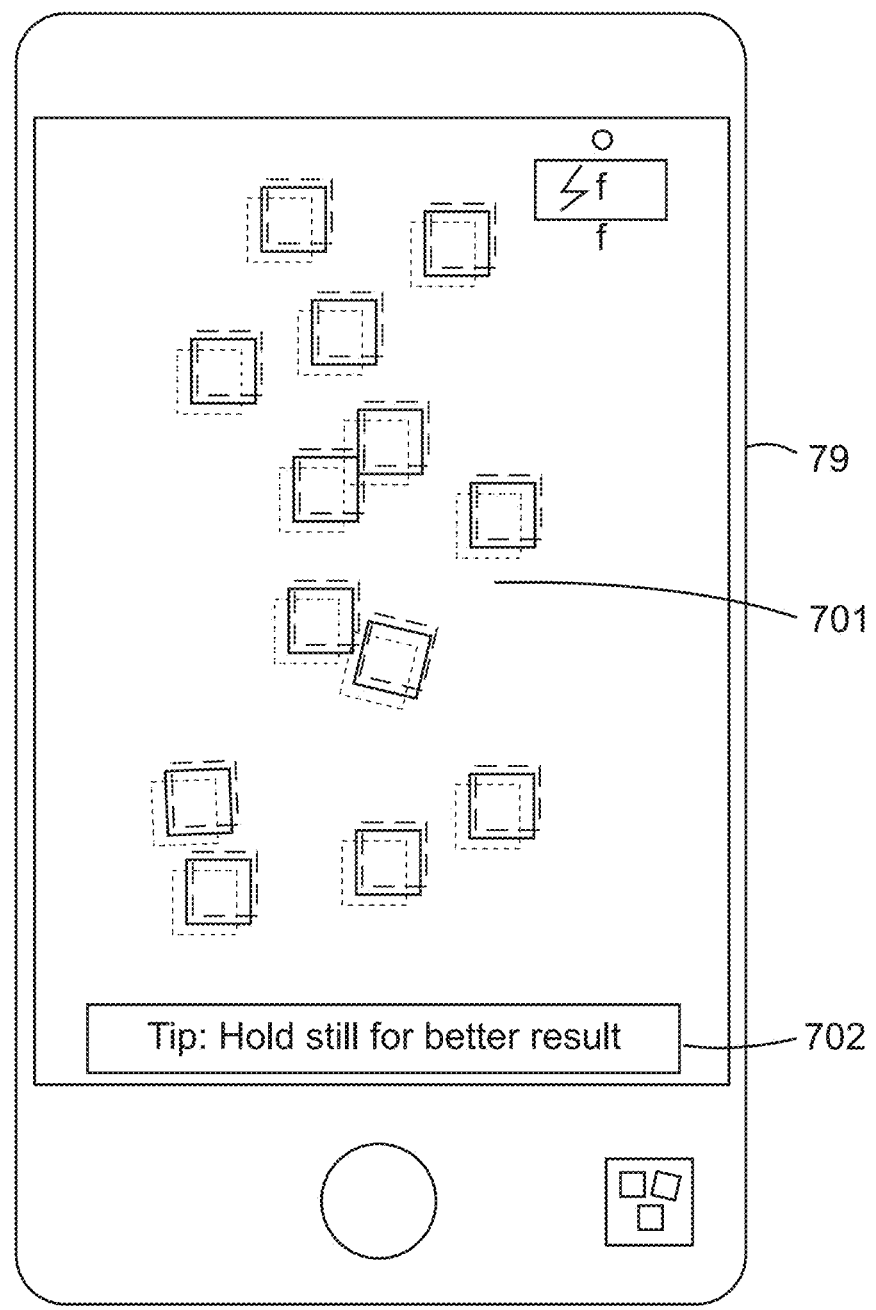

In FIG. 7D, a hint regarding motion is presented in part 702. If the camera is moving while a picture is taken, the picture will be blurry. To avoid this, motion detectors (e.g., accelerometer, gyroscope, etc.) are used to determine how much the device is moving. For example, using accelerometer data, it can be determined if the capture device is being moved. The absolute acceleration value can be compared to a threshold or other classification technique to determine if the camera is steady enough to acquire an image for high quality note extraction. If the detected motion is too great, the user is urged to hold the phone still while capturing, for example.

During the acquisition process the frames from the video presentation of the camera acquisition field of view are processed by a limited high speed version of the note extraction engine to determine the size of the notes in the field of view and the user is advised if the note size (number of pixels) is below a threshold that has been determined for acquiring high quality digital notes. A message advising the user of the small note size is displayed with advice that they move closer. As processor speed increase in the future it can be envisioned that the full note extraction engine could be run on full resolution image frames and the results presented to the user in realtime with advice as to how to improve the quality of note acquisition.

Figure 7E:
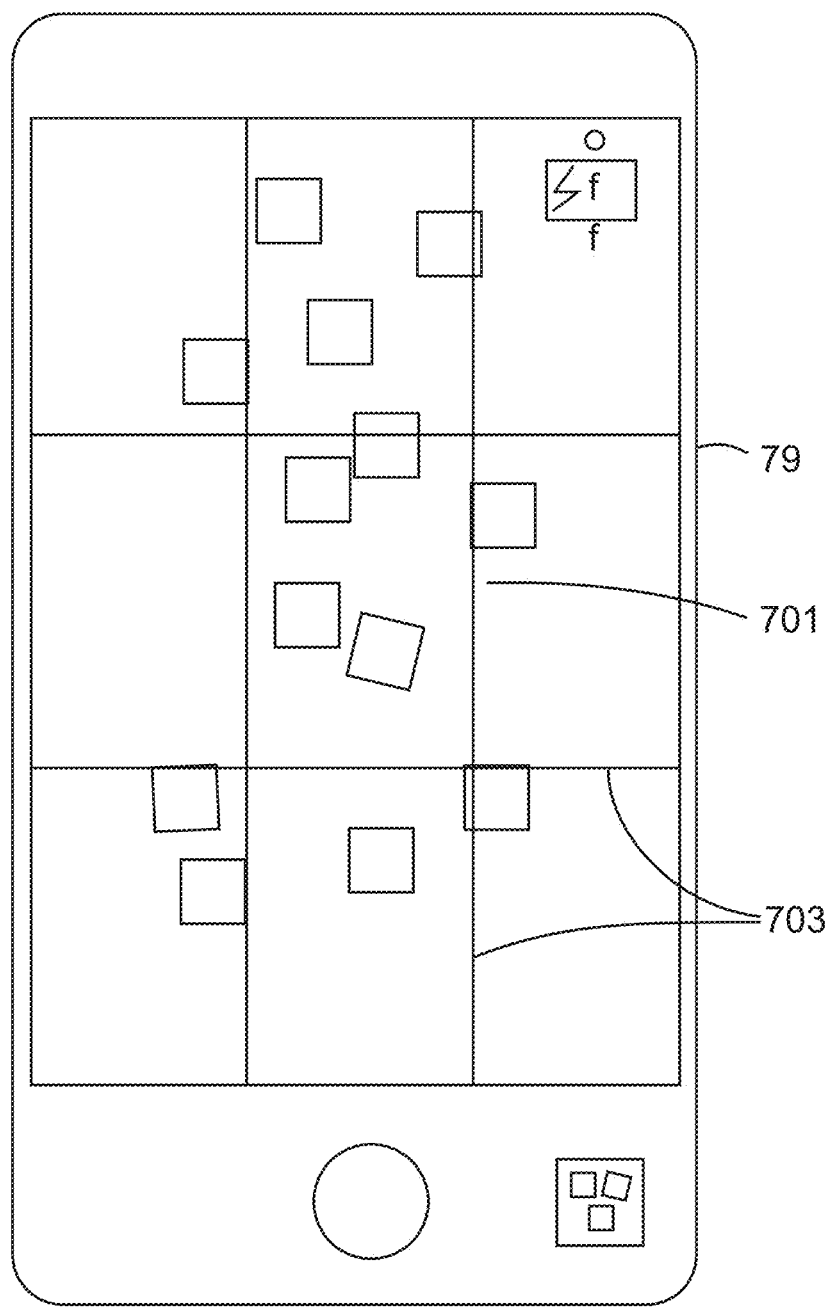

In FIG. 7E, a grid 703 is overlaid with the visual representation of the notes to help alignment of the image capture device. In the example illustrated, the grid 703 is drawn on top of the camera viewfinder, to help the user hold the camera at a good angle in relationship to the notes being captured. In some implementations, a software lock prohibiting capture can be implemented that requires appropriate capture conditions, for example, appropriate levels of light, motion, and distance, to be achieved before a image capture is executed. For example, if the detected note size is below a predetermined threshold, the capture will be blocked.

Figure 7F:
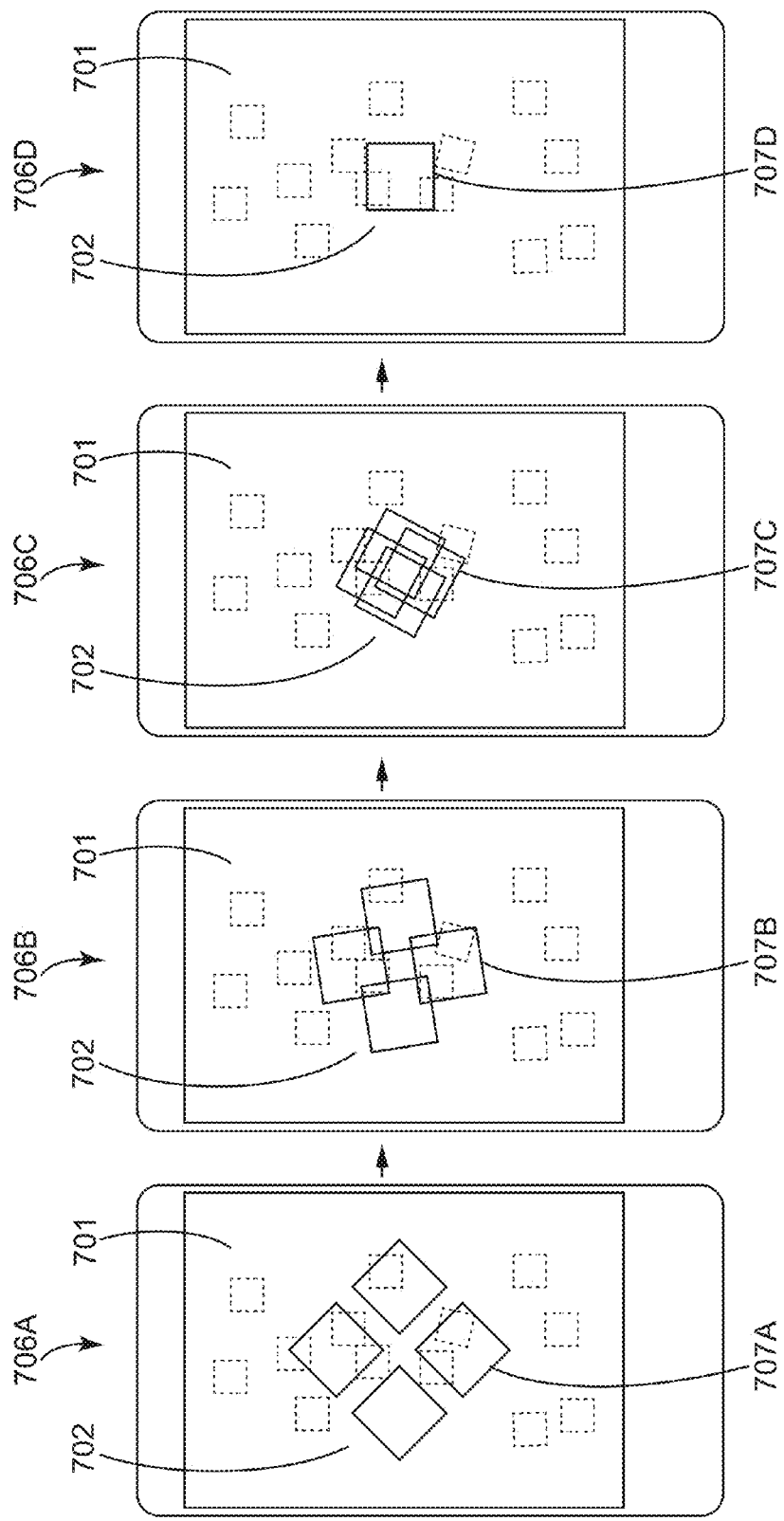

In some embodiments, a hint can be presented as an animation. An example of animated hint is illustrated in FIG. 7F using a series of GUI 79, 706A, 706B, 706C, and 706D. A set of images, 707A, 707B, 707C, and 707D representing an animation hint is presented in part 702 of the GUI 79. This hint can be presented in response to a user input, for example, user holding the shutter button, to indicate the progress of "tap and hold" feature. An image capture device can have a "tap and hold" feature requires that requires the user to press the capture button of icon and hold it for a few seconds, typically 2-3 seconds. During the hold period, the user interface can provide the animated hint as illustrated to let the user know that a tap and hold acquisition is in progress and provides feedback as to how much longer they need to keep the capture button pressed.

Figure 8A:
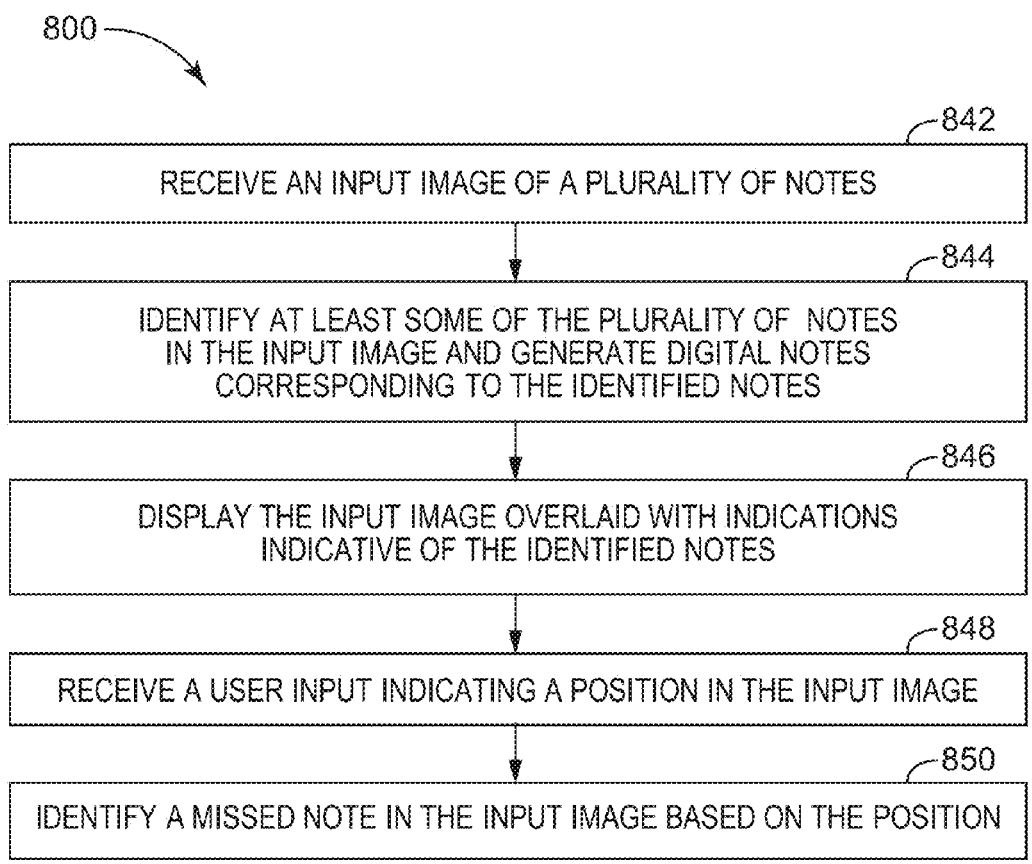
FIG. 8A is a conceptual diagram illustrating an example of a manual assist process.

In some embodiments, the note management application 78 running on a computing device can incorporate manual assist feature, for example, in the note identification module 86, that allows the user to help identify missing notes. FIG. 8A is a conceptual diagram illustrating an example manual assist process 800. First, the computing device receives an input image of a plurality of notes (842). The computing device identifies at least some of the plurality of notes in the input image and generates digital notes (844), for example, using the note identification module 86. Each digital note corresponds to a note identified in the input image. In some cases, one or more notes may be missed during the automatic identification process. The computing device displays the input image overlaid with indications indicative of the identified notes (846) via the GUI. The indications can include marks, labels, corners, boundaries, and/or other visual indicators associated with the identified notes.

The computing device further receives a user input indicating a position as a point of interest in the input image (848). The user input relates to a position of a note that has not been identified, also referred to as a missed note. Then, the computing device identifies the missed note in the input image based on the position (850) and generates an additional digital note corresponding to the missed note. In some cases, the user input can indicate a general boundary of a note such that the computing device can identify the note based on the user input. In such cases, the user input can be, for example, an outline of the boundary of the note in the input image, one or more corners of the note in the input image, or the like. As one example, the input image captures content on a whiteboard or a large paper sheet, the user interface receives a user input of two opposing corners of an area of interest (e.g., a region of handwritten text, drawing, etc.) defining a physical note, and the computing device can determine the general boundary of the physical note and create a digital note representing the physical note. As another example, the user interface receives a user input indicating a position in the input image; the user interface can present a pre-defined geometry shape proximate to the position; the user interface is configured to accept user input to adjust the boundary of the geometry shape to match the area of interest defining a physical note, and the computing device can determine the general boundary of the physical note and create a digital note representing the physical note.

Figure 8B:
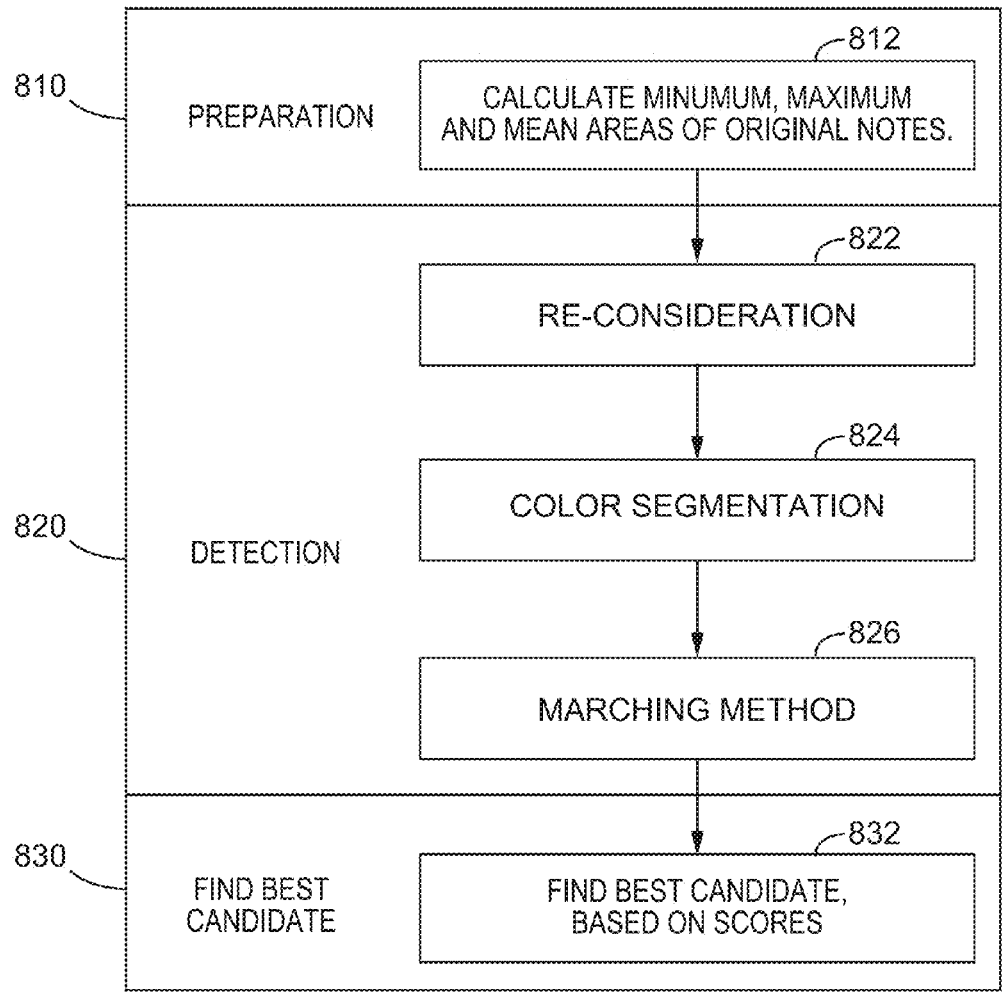
FIG. 8B is a conceptual diagram illustrating optional operations for a manual assist.

Each of the steps in the manual assist process 800 can include several optional operations, as illustrated in FIG. 8B. For example, the computing device can calculate minimum, maximum, and mean areas of original notes and determine the area of interest based on these data (812), as preparation (810). A combination of different approaches can be used in the detection step (820) to identify the note and extract note content. For example, the computing device can find original notes at the point of interest that have been removed in response to user input (822). As another example, the computing device can use color segmentation approach to determine a candidate note (824). Color segmentation refers to a set of techniques for partitioning an image into distinct regions based on how the colors are distributed in the image. In color segmentation, pixels in the image are grouped according to the color values and proximity. Color segmentation methods are described in detail, for example, in articles by Boykov, Yuri, and Gareth Funka-Lea, *Graph cuts and efficient ND image segmentation*, International Journal of Computer Vision 70.2 (2006), pages 109-131; by Felzenszwalb, Pedro F., and Daniel P. Huttenlocher, *Efficient graph-based image segmentation*, International Journal of Computer Vision 59.2 (2004), pages 167-181. As yet another example, the computing device can use a marching method to determine a candidate note (826). The marching method is described in details below. In some cases, the computing device can identify several candidates via different processes and select the best candidate to generate corresponding digital note (830). In some embodiments, the computing device can use a scoring system to evaluate the candidates. The scoring systems may include scores of various properties of the candidates, for example, scores of the sizes, shapes, locations, and the like.

Figure 8C:
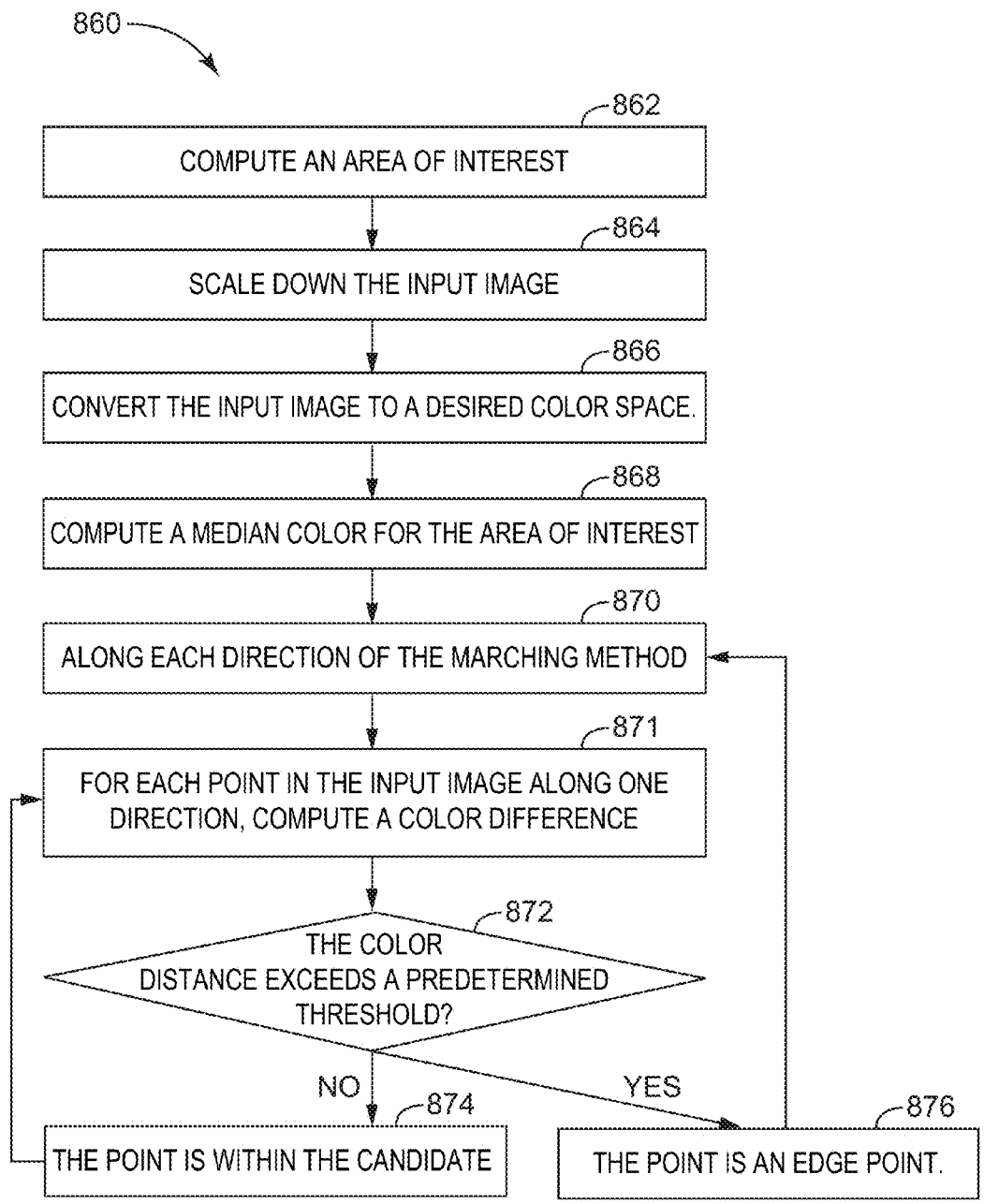
FIG. 8C is a conceptual diagram illustrating an example marching method.

FIG. 8C is a conceptual diagram illustrating an example marching method 860. First, the computing device computes an area of interest (862) based on identified notes. In some cases, the area of interest can be the maximum area of the areas of the identified notes. Optionally, the computing device scales down the input image (864), to achieve faster processing speed, for example. The computing device may convert the input image to a desired color space (866). The applicable color space includes, but not limited to, RGB (red, green, and blue), LAB (e.g., Hunter 1948 L,a,b color space, CIE 1976 (L*, a*, b*) color space), CMYK (cyan, magenta, yellow, and key (black)), HSV (hue, saturation, and value), HSL (hue, saturation, and lightness), HSI (hue, saturation, and intensity), sRGB (standard red, green, and blue) color space. The computing device computes a median color for the area of interest (868). In some cases, the computing device uses a smaller area to compute the median color, for example, using the minimum area of the areas of the identified notes. Along each direction of the marching method, points are evaluated until one or more edge points are reached (870).

In some embodiments, the marching method uses eight directions for marching. For each point input image along one direction, the computing device computes a color difference between the point and the median color (871). The color distance is compared with a predetermined threshold (872). If the color distance is within the predetermined threshold, the point is within the candidate note (874) and the next point along the same direction is evaluated (871). If the color difference exceeds the predetermined threshold, the point is an edge point (876) and the computing device starts to evaluate points along the next direction (870). In some cases, for each of the eight directions, a maximum number of points can be checked for a color distance greater than the pre-defined threshold. If no point along a direction exceeds the threshold, no edge point has been found for that direction. In cases where edge points are found for at least three of the eight directions, a shape can be approximated, given the detected edge points. An approximation will be better the more edge points are found. In some cases, a better score will be assigned to a candidate where a greater number of edge points have been found, than to a candidate where a smaller edge points have been found.

In some embodiments, the scoring system can use a combined score to evaluate candidate notes. For example, the total score of a candidate note can be the sum of the score of its size, the score related to whether it is a removed note, the score of aspect ratio, and other scores. In some cases, the total score of a candidate note can be a weighted sum of its individual scores.

Figure 9:
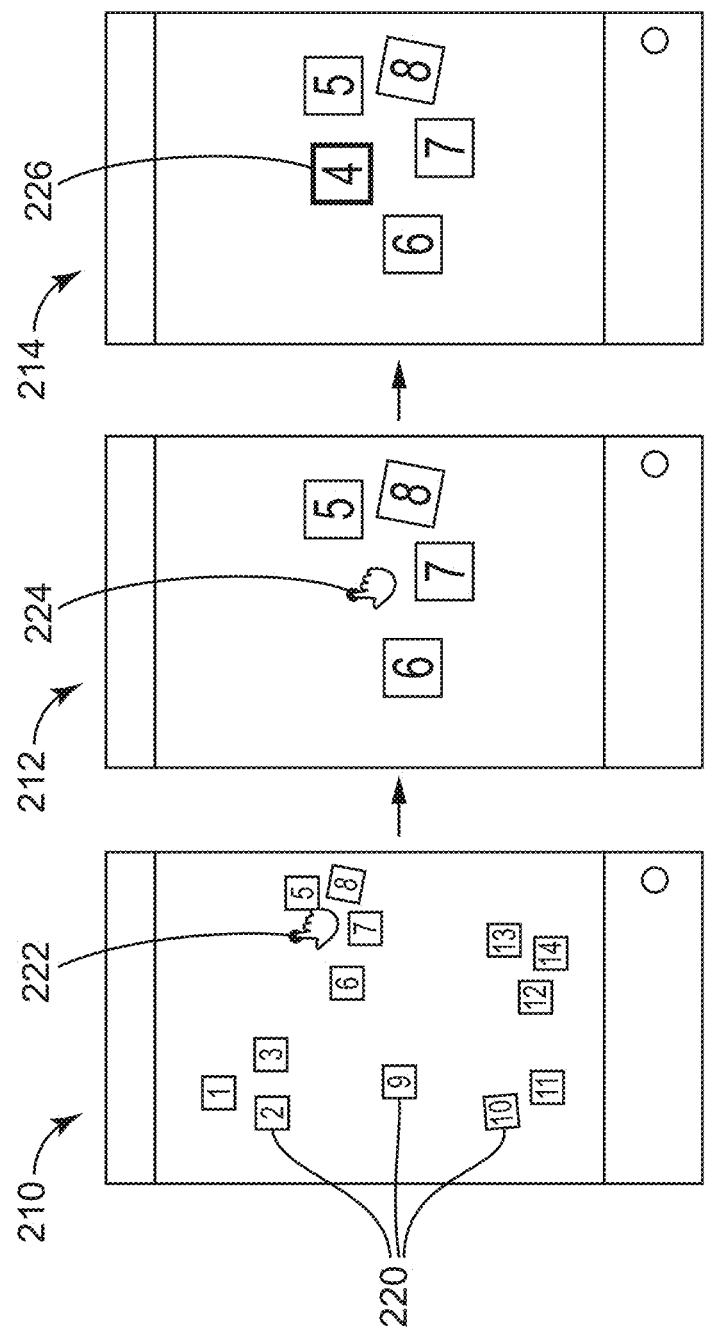
FIG. 9 is a conceptual diagram illustrating an example of using a manual assist process.

FIG. 9 is a conceptual diagram illustrating an example of using a manual assist process. The first GUI 211 shows the input image overlaid with indications 220 of identified notes. The second GUI 212 can be an enlarged portion of interest of the input image in response to a user input, for example, a double tapping motion at position 222. The second GUI 212 receives another user input at position 224. Based on the position 224, a missed note 226 is identified and indicated in the third GUI 214.

FIGS. 10A-10E are conceptual diagrams illustrating different examples of location voids that can be used as scoring based on heuristics. In this example, the heuristic can be a note has higher score if it is surrounded by more identified notes. Based on the heuristic, the location void 242 surrounded by identified notes 230 in the image 232 has the highest score, indicating a location having highest possibility of missed note. The location void 244 having less surrounding identified notes 230 in the image 234 has lower score than 242. The location voids 246 in the image 236 have lower score than 244, where location void 248 in the image 238 has lower score than 246. Location voids 249 in the image 239 have the lowest score. Other heuristics (e.g., color consistence heuristic) may also be used as basis for scoring.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims and their equivalents.

What is claimed is:

1. A method of managing digital notes with a hardware computing device comprising a processor, memory, an image capture device, a hardware display, and a hardware input device, the method comprising:
   creating, by the computing device, a first group of digital notes and a second group of digital notes by:
   capturing, by the image capture device, a single image of a first scene;
   extracting, by the processor, at least a first digital note and a second digital note for the first group of digital notes from the single image of the first scene, where the first scene includes a first plurality of physical notes, each of the physical notes in the first plurality of physical notes comprising a separately movable physical object and having recognizable content thereon, where the first digital note corresponds to a first physical note in the first plurality of physical notes, where the first physical note includes an overlapping portion that overlaps an overlapped portion of a second physical note in the first plurality of physical notes so as to occlude at least a portion of the recognizable content on the second physical note, wherein the overlapping portion of the first physical note and the overlapped portion of the second physical note are the same color, and where the second digital note corresponds to the second physical note;

storing, in the memory, a record for each digital note of the first group of digital notes, where each record includes metadata identifying the first group and recognized data for each physical note;

capturing, by the image capture device, a single image of a second scene different from the first scene;

extracting, by the processor, digital notes for the second group of digital notes from the single image of the second scene, and where the second scene includes a second plurality of physical notes, each of the physical notes in the second plurality of physical notes comprising a separately movable physical object and having recognizable content thereon; and storing, in the memory, a record for each digital note of the second group of digital notes, where each record includes metadata identifying the second group and recognized data for each physical note;

rendering, by the processor, a first group image representing the first group of digital notes and a second group image representing the second group of digital notes;

displaying, by the hardware display, the first group image and the second group image;

receiving, by the hardware user input device, a first user input indicating a first position within the first group image and a second user input indicating a second position within the second group image;

identifying, by the processor and in response to the first user input and the second user input, a digital note in the first group of digital notes based on the first position;

modifying, by the processor, the first group by removing the identified digital note from the first group and modifying the second group by adding the identified digital note to the second group, the modifying comprising changing the metadata for the stored record for the identified digital note; and updating, by the processor, the displayed first group image and the displayed second group image to reflect the modified metadata.

2. The method of claim 1, further comprising:
rendering a modified first group image representing the modified first group.

3. The method of claim 2, wherein a size of the modified first group image is reduced relative to a size of the first group image.

4. The method of claim 1, further comprising:
rendering a modified second group image representing the modified second group.

5. The method of claim 4, wherein the identified digital note is rendered within the modified second group image.

6. The method of claim 4, wherein a size of the modified second group image is enlarged relative to a size of the second group image.

7. The method of claim 1, wherein the digital notes represented in in at least one of the first and the second group images are arranged in a grid format.

8. The method of claim 1, wherein each of the first and second digital notes includes a respective image of the corresponding recognized physical note.

9. A computing device comprising: a processor, memory, an image capture device, a hardware display, and a hardware input device, wherein the computing device is configured to create a first group of digital notes and a second group of digital notes by:

capturing, by the image capture device, a single image of a first scene;

extracting, by the processor, at least a first digital note and a second digital note for the first group of digital notes from the single image of the first scene, where the first scene includes a first plurality of physical notes, each of the physical notes in the first plurality of physical notes comprising a separately movable physical object and having recognizable content thereon, where the first digital note corresponds to a first physical note in the first plurality of physical notes, where the first physical note includes an overlapping portion that overlaps an overlapped portion of a second physical note in the first plurality of physical notes so as to occlude at least a portion of the recognizable content on the second physical note, wherein the overlapping portion of the first physical note and the overlapped portion of the second physical note are the same color, and where the second digital note corresponds to the second physical note;

storing, in the memory, a record for each digital note of the first group of digital notes, where each record includes metadata identifying the first group and recognized data for each physical note;

capturing, by the image capture device, a single image of a second scene different from the first scene;

extracting, by the processor, digital notes for the second group of digital notes from the single image of the second scene where the second scene includes a second plurality of physical notes, each of the physical notes in the second plurality of physical notes comprising a separately movable physical object and having recognizable content thereon; and storing, in the memory, a record for each digital note of the second group of digital notes, where each record includes metadata identifying the second group and recognized data for each physical note;

rendering, by the processor, a first group image representing the first group of digital notes and a second group image representing the second group of digital notes;

displaying, by the hardware display, the first group image and the second group image;

receiving, by the hardware user input device, a first user input indicating a first position within the first group image and a second user input indicating a second position within the second group image;

identifying, by the processor in response to the first user input and the second user input, a digital note in the first group of digital notes based on the first position;

modifying, by the processor, the first group by removing the identified digital note from the first group and modifying the second group by adding the identified digital note to the second group, the modifying comprising changing the metadata for the stored record for the identified digital note; and updating, by the processor, the displayed first group image and the displayed second group image to reflect the modified metadata.

10. The computing device of claim 9, wherein the computing device is further configured to:
render a modified first group image representing the modified first group.

11. The computing device of claim 10, wherein a size of the modified first group image is reduced relative to a size of the first group image.

12. The computing device of claim 9, wherein the computing device is further configured to:

render a modified second group image representing the modified second group.

13. The computing device of claim 12, wherein the identified digital note is rendered within the modified second group image.

14. The computing device of claim 12, wherein a size of the modified second group image is enlarged relative to a size of the second group image.

15. The computing device of claim 9, wherein the digital notes represented in in at least one of the first and the second group images are arranged in a grid format.

16. The computing device of claim 9, wherein each of the first and second digital notes includes a respective image of the corresponding recognized physical note.

* * * * *